United States Patent

[11] 3,615,972

| [72] | Inventors | Donald S. Morehouse, Jr.<br>Midland, Mich.;<br>Roland J. Tetreault, Springfield, Mass. |
| --- | --- | --- |
| [21] | Appl. No. | 634,691 |
| [22] | Filed | Apr. 28, 1967 |
| [45] | Patented | Oct. 26, 1971 |
| [73] | Assignee | The Dow Chemical Company<br>Midland, Mich.<br>Continuation-in-part of application Ser. No. 306,050, Sept. 3, 1963, now abandoned, Continuation-in-part of application Ser. No. 246,529, Dec. 21, 1962, now abandoned. |

[54] EXPANSIBLE THERMOPLASTIC POLYMER PARTICLES CONTAINING VOLATILE FLUID FOAMING AGENT AND METHOD OF FOAMING THE SAME
48 Claims, 9 Drawing Figs.

[52] U.S. Cl.................................................. 156/79,
117/6, 117/36.7, 117/155 UA, 156/276, 156/297,
156/300, 161/160, 161/161, 161/218, 161/251,
260/31.2 R, 260/78.5 HC, 260/78.5 E, 260/78.5
CL, 260/78.5 UA
[51] Int. Cl....................................................... C08j 1/14,
C08j 1/26, B01j 13/02

[50] Field of Search............................ 260/2.5 B;
117/36.1, 72; 156/79

[56] References Cited
UNITED STATES PATENTS

| 2,386,995 | 10/1945 | Wigal................ | 260/2.5 |
| --- | --- | --- | --- |
| 2,945,776 | 7/1960 | Conguisti et al........... | 260/2.5 B |
| 2,988,461 | 6/1961 | Eichel................ | 117/36.1 |
| 3,016,308 | 1/1962 | Macaulay............ | 117/36.1 |
| 3,159,592 | 12/1964 | McHugh et al........... | 117/36.1 |
| 3,255,127 | 6/1966 | Von Bonin........... | 260/2.5 |
| 3,256,219 | 6/1966 | Will.................... | 260/2.5 |
| 3,359,130 | 12/1967 | Goldman............. | 260/2.5 |
| 3,379,799 | 4/1968 | Goldman............. | 260/2.5 |

Primary Examiner—Samuel H. Blech
Assistant Examiner—Morton Foelak
Attorneys—Griswold and Burdick, Richard G. Waterman and Robert B. Ingraham ABSTRACT: Thermoplastic microspheres are prepared which encapsulate a liquid blowing agent. Heating of the microspheres causes expansion. The microspheres are useful for coatings, moldings, plastic smoke, etc. Urnlike hollow microspheres are also shown. The expandable microspheres are prepared by a suspension-type polymerization of droplets of a mixture of monomer and blowing agent.

INVENTORS.
Donald S. Morehouse, Jr.
Roland J. Tetreault

BY

EXPANSIBLE THERMOPLASTIC POLYMER PARTICLES CONTAINING VOLATILE FLUID FOAMING AGENT AND METHOD OF FOAMING THE SAME

This application is a continuation-in-part of our copending application Ser. No. 306,050, filed Sept. 3, 1963 now abandoned, which in turn is a continuation-in-part of application Ser. No. 246,529, filed Dec. 21, 1962 also now abandoned.

This invention relates to plastic particles. It more particularly relates to plastic particles which have incorporated therein a liquid phase and to particles and materials prepared therefrom.

Foamed thermoplastic resins and products derived therefrom have achieved a considerable and significant commercial success in a number of fields including insulation, decoration, packing, packaging, electrical insulation, and the like. Thermoplastic resinous foamed articles are usually prepared by one of several methods. One of the methods comprises the extrusion of a heat-plastified thermoplastic resinous material containing a blowing or raising agent into a region of lower pressure, in the region of lower pressure the blowing or raising agent provides internal pressure sufficient to provide a plurality of isolated gaseous cells in a thermoplastic resinous matrix. An alternate method of preparing a thermoplastic resinous foam is to extrude a heat-plastified thermoplastic material containing a blowing or raising agent at a temperature sufficiently low to prevent foaming or expansion of the resinous material. Generally, in such a method the material is extruded in the form of strands which are chopped or otherwise comminuted into relatively small particles. A third method which has found wide commercial acceptance is the polymerization of a plurality of beadlike particles having a minor amount of a volatile blowing agent dissolved within the bead sufficient that when, on heating, the bead expands to a particle having a plurality of cells or voids.

One of the major disadvantages of the methods and products known to the art is that inherently the cell size of the foamed plastic material is relatively large and that the particles themselves are not readily available commercially in sizes sufficiently small for some applications. In many instances, it is desirable to have available an expandable thermoplastic resinous material which is capable of forming a unitary cellular body having a small cell size and capable of conforming to minute variations of a mold cavity. Further, it would be advantageous and beneficial to have available a thermoplastic resinous particle or bead which is capable of expanding into a single cell when required. It would also be beneficial if there were available a method of fabricating thermoplastic resinous particles having a generally cuplike or generally spherical urnlike configuration.

These benefits and other advantages in accordance with the invention are readily achieved by providing a thermoplastic resinous particle having encapsulated therein at least one liquid body, said liquid body comprising a volatile raising agent for said thermoplastic resinous particle.

Further features and advantages of the invention will become more apparent from the following specification when taken in connection with the accompanying drawing wherein.

Figure 1:
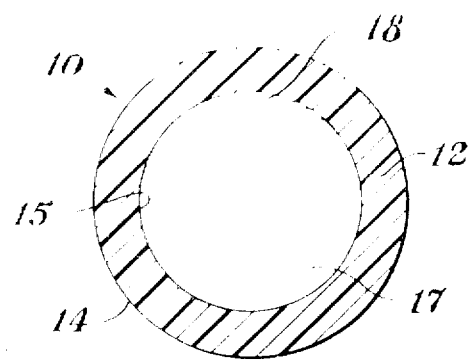
FIG. 1 depicts a thermoplastic resinous particle in accordance with the invention.

In FIG. 1 there is illustrated a sectional view of a particle generally designated by the reference numeral 10. The particle 10 comprises the thermoplastic resinous, generally spherical shell 12. The shell 12 defines an outer spherical surface 14 and an inner spherical surface 15. Confined within the spherical surface 15 is a liquid blowing agent 17, and the blowing agent 17 fills a major portion of the cavity defined by the inner surface 15 and serves to partially define the vapor space 18. The particle 10 is of generally symmetrical spherical configuration having the inner surface 15 and the outer surface 14 in a generally concentric arrangement.

Figure 2:
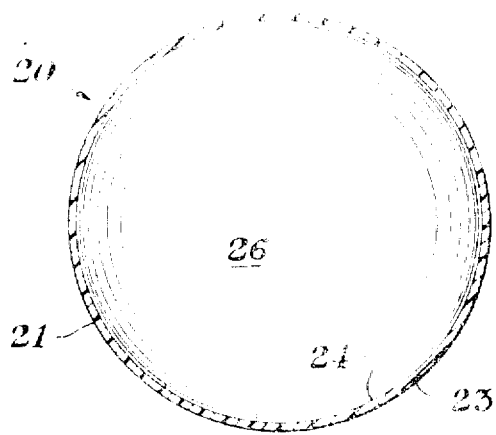
FIG. 2 illustrates a particle in accordance with the invention after heat-treating.

In FIG. 2 there is illustrated a sectional view of a monocellular particle or monocell generally designated by the reference numeral 20 which comprises a body 21 of thermoplastic resinous material. The body 21 is in the form of a generally spherical shell having an outer surface 23 and an inner surface 24. The inner surface 24 defines a space 26. The particle 20 of FIG. 2 is formed by heating a particle such as particle 10 of FIG. 1 to a temperature sufficiently high to permit plastic flow of the wall 12 and to vaporize or volatilize at least a portion of the blowing agent 17 sufficient to provide adequate pressure to deform the spherical shell 12 of FIG. 1 into the shell 21 of FIG. 2.

On cooling of the shell 21, the thermoplastic resinous material no longer will flow and deform and it retains its increased dimension, while the blowing agent tends to condense and results in a reduced pressure within the particle. Usually on expansion of a particle such as 10 into the configuration of the particle such as 20, the pressure within the space 26 will usually be less than the atmospheric pressure surrounding the outer surface 23 of the shell 21 and the wall thickness of the shell 21 then governs the rate at which the higher pressure atmosphere outside the expanded particle 20 diffuses through the wall and into the space 26. Frequently, the raising agent simultaneously diffuses out of the particle as the atmosphere or air surrounding the particle diffuses in. Generally, the expanded particles on storage tend to lose their blowing agent to the atmosphere.

Figure 3:
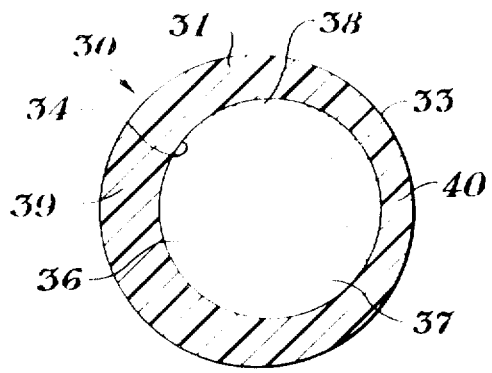
FIG. 3 illustrates an alternate embodiment of a particle in accordance with the invention.

In FIG. 3 there is illustrated a sectional view of an alternate embodiment of the invention wherein a generally spherical particle 30 comprises a shell 31, defining a generally spherical outer surface 33 and an inner surface 34. The inner surface 34 defines a cavity or space 36 having disposed therein a volatile blowing agent 37 and a vapor space 38. The space 36 is not disposed concentrically with the outer surface 33, thus providing the shell 31 with a heavy or thick wall portion 39 and a thin wall portion 40. The particle 30, on heating to a temperature sufficiently high to promote plastic flow in the shell 31 and to volatilize the blowing agent, forms a particle such as particle 45 of FIG. 4.

Figure 4:
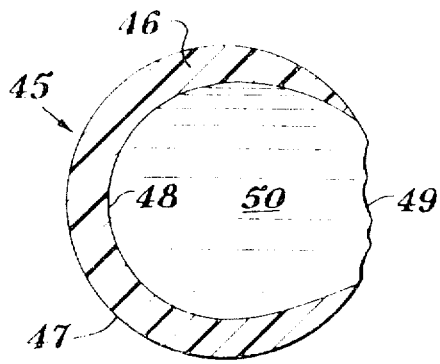
FIG. 4 is a sectional view of a particle of FIG. 3 after heating.

FIG. 4 is a sectional view of a particle 45. The particle 45 comprises a generally spherical urnlike or cuplike configuration having a body portion 46. The body portion 46 defines an exterior surface 47 and an interior surface 48. The exterior surface 47 and the interior surface 48 define an opening 49 to the space 50.

Figure 5:
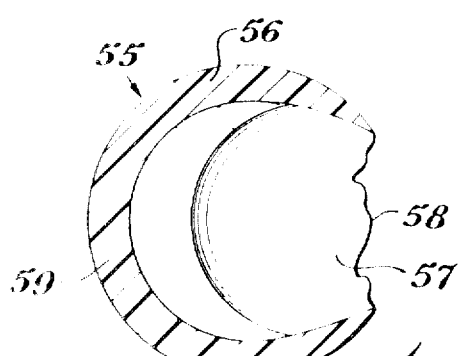
FIG. 5 illustrates a sectional view of a particle in accordance with FIG. 3 containing an additament.

In FIG. 5 there is illustrated a sectional view of a particle generally indicated by the reference numeral 55 which is similar to the particle 45. The particle 55 has a wall portion 56 defining an interior cavity 57 and an opening 58. Disposed within the cavity 57 is a liquid 59. The liquid 59 suitably may be any desired material which is nonreactive with or a nonsolvent for the thermoplastic resinous material of the particle 55.

Figure 6:
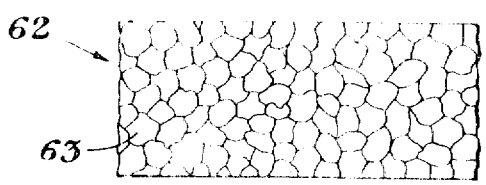
FIG. 6 is a sectional view of a body comprised of expanded particles of FIG. 1.

In FIG. 6 there is depicted a sectional view of a body 62 of particles 63 which are formed by the simultaneous expansion and adherence of the particles 63 to their adjacent neighbors.

Figure 7:
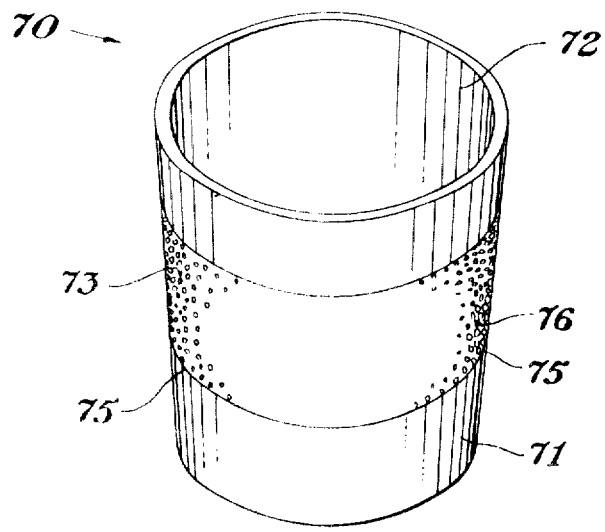
FIG. 7 depicts an article having a coating employing particles of the invention.

In FIG. 7 there is illustrated an article or container generally designated by the reference numeral 70. The container 70 comprises an exterior wall portion 71 defining a cavity 72. Disposed peripherally about the wall portion 71 is an adherent coating 73 containing a plurality of expandable thermoplastic resinous particles 75 having encapsulated therein a liquid-blowing agent 76. (Relative size of particles is greatly exaggerated for clarity.)

Figure 8:
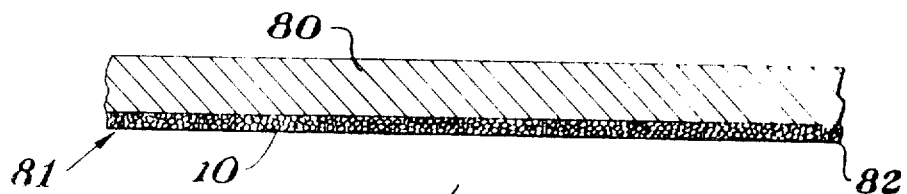
FIG. 8 depicts a schematic enlarged sectional view of a coating such as in FIG. 7.

In FIG. 8 is an enlarged schematic cross-sectional view of a substrate 80 having on one surface thereof a coating 81. The coating 81 comprises a thermoplastic resinous binder 82 having contained therein a plurality of expandable particles 10.

Figure 9:
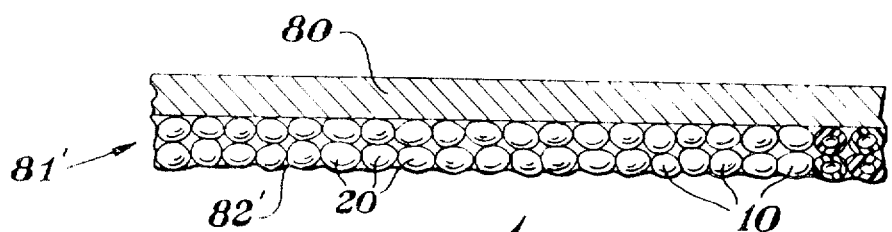
FIG. 9 is a schematic enlarged sectional view of the coating of FIG. 8 in expanded form.

FIG. 9 depicts an enlarged schematic sectional view of a substrate 80 having on one major surface thereof a coating 81' comprising a binder 82' adhering together a plurality of particles 20. The coating 81' of FIG. 9 is readily achieved by heating the coating 81 of FIG. 8 to a temperature at which the particles 10 expand to form the particles 20.

Particles in accordance with the invention are readily prepared from a wide variety of materials. Advantageously, the particles in accordance with the invention are usually prepared by providing an aqueous dispersion of (1) organic monomeric materials suitable for polymerization to a thermoplastic resinous material having the desired physical properties, (2) a liquid blowing or raising agent which exerts little solvent action on the resulting polymer, and in a quantity in excess of that which is soluble in the polymer, and (3) a dispersion stabilizing material which is utilized to maintain the dispersion, subsequently polymerizing the monomeric material to solid spherical particles having a quantity of the liquid-blowing agent encapsulated therein as a distinct and separate phase.

A wide variety of organic materials may be employed with advantage in the practice of the invention. Typical of these are the alkenyl aromatic monomers. By the term "alkenyl aromatic monomers" is meant a compound having the general formula:

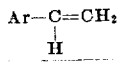

wherein Ar represents an aromatic hydrocarbon radical or an aromatic halohydrocarbon radical of the benzene series. Examples of such alkenyl aromatic monomers are styrene, o-methylstyrene, m-methylstyrene, p-methylstyrene, ethylstyrene, ar-vinyl-xylene, ar-chlorostyrene, or ar-bromostyrene. Various other styrene derived compounds may be employed such as vinylbenzylchloride, p-tert.-butylstyrene, and the like.

The acrylate monomers alone or in combination with the alkenyl aromatic monomers may also be utilized. Such acrylate-type monomers include monomers of the formula:

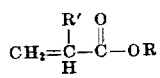

wherein R is selected from the group consisting of hydrogen and an alkyl radical containing from about one to 12 carbon atoms and R' is selected from the group consisting of hydrogen and methyl. Typical acrylate materials which may be used are methyl methacrylate, ethyl acrylate, propyl acrylate, butyl acrylate, butyl methacrylate, propyl methacrylate, butyl methacrylate, lauryl acrylate, 2-ethylhexylacrylate, ethyl methacrylate, and the like.

Copolymers of vinyl chloride and vinylidene chloride, acrylonitrile with vinyl chloride, vinyl bromide, and similar halogenated vinyl compounds may be incorporated in compositions in accordance with the invention. Esters, such as the vinyl esters having the formula:

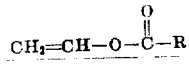

wherein R is an alkyl radical containing from one to 17 carbon atoms, may also frequently be employed with benefit. Typical monomers falling within this classification are vinyl acetate, vinyl butyrate, vinyl stearate, vinyl laurate, vinyl myristate, vinyl propionate, and the like.

Beneficially, in certain instances and when using specific dispersing agents, it is frequently advantageous to incorporate in the polymeric material a portion of a copolymerizable acid. Frequently, further to improve the geometric form of the particles in accordance with the invention and oftentimes provide increased adhesion of the resultant polymeric particles to various polar surfaces such as metal, wood, and the like.

Typical copolymerizable acids are acrylic acid, methacrylic acid, itaconic acid, citraconic acid, maleic acid, fumaric acid, vinylbenzoic acid, and the like.

A wide variety of blowing or raising agents may be incroporated within the polymerization system. They can be volatile fluid-forming agents such as aliphatic hydrocarbons including ethane, ethylene, propane, propene, butene, isobutene, neopentane, acetylene, hexane, heptane, or mixtures of one or more such aliphatic hydrocarbons having a molecular weight of at least 26 and a boiling point below the range of the softening point of the resinous material when saturated with the particular blowing agent utilized.

Other suitable fluid-forming agents are the chlorofluorocarbons such as:

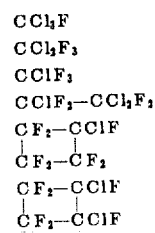

and tetraalkyl silanes such as tetramethyl silane, trimethylethyl silane, trimethylisopropyl silane and trimethyl-n-propyl silane. The boiling point of such foaming agents at atmospheric pressure should be about the same temperature range or lower than the softening point of the resinous material employed.

Suspensions of monomeric materials for the preparation of particles in accordance with the invention are usually made employing a suspending agent such as a water-soluble gum such as methyl cellulose, gum agar, hydroxypropyl methylcellulose, carboxy methylcellulose, colloidal silica, colloidal clays, such as those commercially available under the trade name of "Bentonite."

Usually, in order to initiate polymerization, a suitable catalyst, preferably of the oil-soluble variety, is incorporated within the monomeric system. Suitable catalysts include peroxide compounds such as organic peroxide as well as radiation, such as high energy ionizing radiation. Suitable organic peroxides include benzyl peroxide, lauryl peroxide, tert.-butyl peracetate, tert.-butyl perbenzoate, cumene hydroperoxide, cumene ethylperoxide, and the like.

Beneficially, in preparing the particles in accordance with the invention, usually is is desirable, although not necessary, to exclude oxygen and similar free radical chain-terminating materials from the system. Beneficially, this is readily accomplished by flushing the system with an inert atmosphere such as nitrogen and the like.

Generally, in preparing the aqueous dispersions to be polymerized in accordance with the invention, the monomer and blowing agent constitute a major portion of the oil phase and are incorporated with water in a ratio of from about 1:1 oil-phase-to-water to about 1:6. Usually, the suitable dispersing agent is incorporated within the water phase and the monomer, blowing agent, and catalyst are mixed. Usually, it is beneficial to provide violent agitation if the resultant particles are desired to have a small diameter.

Generally, if extremely small particles are desired, it is necessary to use a homogenizer or similar device in order to obtain uniform control of particle size. It is frequently beneficial to utilize a limited coalescence technique in combination with a mechanical homogenizer or similar devices that will subject the dispersion to conditions of high shear prior to polymerization.

The following general procedure may be utilized in a limited coalescence technique:

1. The polymerizable liquid containing the blowing agent is dispersed within an aqueous nonsolvent liquid medium to form a dispersion of droplets having sizes not larger than the size desired for the polymer globules, whereupon
2. The dispersion is allowed to rest and to reside with only mild or no agitation for a time during which a limited coalescence of the dispersed droplets takes place with the formation of a lesser number of larger droplets, such coalescence being limited due to the composition of the suspending medium, the size of the dispersed droplets thereby becoming remarkably uniform and of a desired magnitude, and
3. The uniform droplet dispersion is then stabilized by addition of thickening agents to the aqueous suspending medium, whereby the uniform-sized dispersed droplets are further protected against coalescence and are also retarded from concentrating in the dispersion due to difference in density of the disperse phase and continuous phase, and
4. The polymerizable liquid or oil phase in such stabilized dispersion is subjected to polymerization conditions and polymerized, whereby globules of polymer are obtained having spheroidal shape and remarkably uniform and desired size, which size is predetermined principally by the composition of the initial aqueous liquid suspending medium.

The diameter of the droplets of polymerizable liquid, and hence the diameter of the beads of polymer, can be varied predictably, by deliberate variation of the composition of the aqueous liquid dispersion, within the range of from about one-half of a micron or less to about 0.5 centimeter. For any specific operation, the range of diameters of the droplets of liquid, and hence of polymer beads, has a factor in the order of three or less as contrasted to factors of 10 or more for diameters of droplets and beads prepared by usual suspension polymerization methods employing critical agitation procedures. Since the bead size, e.g., diameter, in the present method is determined principally by the composition of the aqueous dispersion, the mechanical conditions, such as the degree of agitation, the size and design of the apparatus used, and the scale of operation, are not highly critical. Furthermore, by employing the same composition, the operations can be repeated, or the scale of operations can be changed, and substantially the same results can be obtained.

The present method is carried out by dispersing one part by volume of a polymerizable liquid into at least 0.5, preferably from 0.5 to about 10 or more, parts by volume of a nonsolvent aqueous medium comprising water and at least the first of the following ingredients:

1. A water-dispersible, water-insoluble solid colloid, the particles of which, in aqueous dispersion, have dimensions in the order of from about 0.008 to about 50 microns, which particles tend to gather at the liquid-liquid interface or are caused to do so by the presence of
2. A water-soluble "promotor" that affects the "hydrophilic-hydrophobic balance" of the solid colloid particles; and/or
3. An electrolyte; and/or
4. Colloid-active modifiers such as peptizing agents, surface-active agents and the like; and, usually,
5. A water-soluble, monomer-insoluble inhibitor of polymerization.

The water-dispersible, water-insoluble solid colloids can be inorganic materials such as metal salts or hydroxides or clays, or can be organic materials such as raw starches, sulfonated cross-linked organic high polymers, resinous polymers and the like.

The solid colloidal material must be insoluble but dispersible in water and both insoluble and nondispersible in, but wettable by, the polymerizable liquid. The solid colloids must be much more hydrophilic than oleophilic so as to remain dispersed wholly within the aqueous liquid. The solid colloids employed for limited coalescence are ones having particles that, in the aqueous liquid, retain a relatively rigid and discrete shape and size within the limits stated. The particles may be greatly swollen and extensively hydrated, provided that the swollen particle retains a definite shape, in which case the effective size is approximately that of the swollen particle. The particles can be essentially single molecules, as in the case of extremely high molecular weight cross-linked resins, or can be aggregates of many molecules. Materials that disperse in water to form true or colloidal solutions in which the particles have a size below the range stated or in which the particles are so diffuse as to lack a discernible shape and dimension are not suitable as stabilizers for limited coalescence. The amount of solid colloid that is employed is usually such as corresponds to from about 0.01 to about 10 or more grams per 100 cubic centimeters of the polymerizable liquid.

In order to function as a stabilizer for the limited coalescence of the polymerizable liquid droplets, it is essential that the solid colloid must tend to collect within the aqueous liquid at the liquid-liquid interface, i.e., on the surface of the oil droplets. (The term "oil" is occasionally used herein as generic to liquids that are insoluble in water.) In many instances, it is desirable to add a "promoter" material to the aqueous composition to drive the particles of the solid colloid to the liquid-liquid interface. This phenomenon is well known in the emulsion art, and is here applied to solid colloidal particles, as a expanded of adjusting the "hydrophilic-hydrophobic balance."

Usually, the promoters are organic materials that have an affinity for the solid colloid and also for the oil droplets and that are capable of making the solid colloid more oleophilic. The affinity for the oil surface is usually due to some organic portion of the promoter molecule while the affinity for the solid colloid is usually due to opposite electrical charges. For example, positively charged complex metal salts or hydroxides, such as aluminum hydroxide, can be promoted by the presence of negatively charged organic promoters such as water-soluble sulfonated polystyrenes, alginates and carboxymethylcellulose. Negatively charged colloids, such as Bentonite, are promoted by positively charged promoters such as tetramethyl ammonium hydroxide or chloride or water-soluble complex resinous amine condensation products such as the water-soluble condensation products of diethanolamine and adipic acid, the water-soluble condensation products of ethylene oxide, urea and formaldehyde, and polyethylenimine. Amphoteric materials such as proteinaceous materials like gelatin, glue, casein, albumin, glutin and the like, are effective promoters for a wide variety of colloidal solids. Nonionic materials like methoxycellulose are also effective in some instances. Usually, the promoter need be used only to the extent of a few parts per million of aqueous medium although larger proportions can often be tolerated. In some instances, ionic materials normally classed as emulsifiers, such as soaps, long chain sulfates and sulfonates and the long chain quaternary ammonium compounds, can also be used as promoters for the solid colloids, but care must be taken to avoid causing the formation of stable colloidal emulsions of the polymerizable liquid and the aqueous liquid medium.

An effect similar to that of organic promoters is often obtained with small amounts of electrolytes, e.g., water-soluble, ionizable alkalies, acids and salts, particularly those having polyvalent ions. These are especially useful when the excessive hydrophilic or insufficient oleophilic characteristic of the colloid is attributable to excessive hydration of the colloid structure. For example, a suitably cross-linked sulfonated polymer of styrene is tremendously swollen and hydrated in water. Although the molecular structure contains benzene rings which should confer on the colloid some affinity for the oil phase in the dispersion, the great degree of hydration causes the colloidal particles to be enveloped in a cloud of associated water. The addition of a soluble, ionizable polyvalent cationic compound, such as an aluminum or calcium salt, to the aqueous composition causes extensive shrinking of the swollen colloid with exudation of a part of the associated water and exposure of the organic portion of the colloid particle, thereby making the colloid more oleophilic.

THe solid colloidal particles whose hydrophilic-hydrophobic balance is such that the particles tend to gather in the aqueous phase at the oil-water interface, gather on the surface of the oil droplets and function as protective agents in the phenomenon of limited coalescence.

Other agents that can be employed in an already known manner to effect modification of the colloidal properties of the aqueous composition are those materials known in the art as peptizing agents, flocculating and deflocculating agents, sensitizers, surface active agents and the like.

It is sometimes desirable to add to the aqueous liquid a few parts per million of a water-soluble, oil-insoluble inhibitor of polymerization effective to prevent the polymerization of monomer molecules that might diffuse into the aqueous liquid or that might be absorbed by colloid micelles and that, if allowed to polymerize in the aqueous phase, would tend to make emulsion-type polymer dispersions instead of, or in addition to, the desired bead or pearl polymers.

The aqueous medium containing the water-dispersible solid colloid is then admixed with the liquid polymerizable material in such a way as to disperse the liquid polymerizable material as small droplets within the aqueous medium. This dispersion can be accomplished by any usual means, e.g., by mechanical stirrers or shakers, by pumping through jets, by impingement, or by other procedures causing subdivision of the polymerizable material into droplets in a continuous aqueous medium.

The degree of dispersion, e.g., by agitation is not critical except that the size of the dispersed liquid droplets must be no larger, and is preferably much smaller, than the stable droplet size expected and desired in the stable dispersion. When such condition has been attained, the resulting dispersion is allowed to rest with only mild, gentle movement, if any, and preferably without agitation. Under such quiescent conditions, the dispersed liquid phase undergoes a limited degree of coalescence.

"Limited coalescence" is a phenomenon wherein droplets of liquid dispersed in certain aqueous suspending media coalesce, with formation of a lesser number of larger droplets, until the growing droplets reach a certain critical and limiting size, whereupon coalescence substantially ceases. The resulting droplets of dispersed liquid, which can be as large as 0.3 and sometimes 0.5 centimeter in diameter, are quite stable as regards further coalescence and are remarkably uniform in size. If such a large droplet dispersion be vigorously agitated, the droplets are fragmented into smaller droplets. The fragmented droplets, upon quiescent standing, again coalesce to the same limited degree and form the same uniform-sized, large droplet, stable dispersion. Thus, a dispersion resulting from the limited coalescence comprises droplets of substantially uniform diameter that are stable in respect to further coalescence.

The principles underlying this phenomenon have now been adapted to cause the occurrence of limited coalescence in a deliberate and predictable manner in the preparation of dispersions of polymerizable liquids in the form of droplets of uniform and desired size.

In the phenomenon of limited coalescence, the small particles of solid colloid tend to collect with the aqueous liquid at the liquid-liquid interface, i.e., on the surface of the oil droplets. It is thought that droplets which are substantially covered by such solid colloid are stable to coalescence while droplets which are not so covered are not stable. In a given dispersion of a polymerizable liquid the total surface area of the droplets is a function of the total volume of the liquid and the diameter of the droplets. Similarly, the total surface area barely coverable by the solid colloid, e.g., in a layer one particle thick, is a function of the amount of the colloid and the dimensions of the particles thereof. In the dispersion as initially prepared, e.g., by agitation, the total surface area of the polymerizable liquid droplets is greater than can be covered by the solid colloid. Under quiescent conditions, the unstable droplets begin to coalesce. The coalescence results in a decrease in the number of oil droplets and a decrease in the total surface area thereof up to a point at which the amount of colloidal solid is barely sufficient substantially to cover the total surface of the oil droplets, whereupon coalescence substantially ceases.

The limiting diameter of the stable oil droplets is directly proportional to the oil phase volume and is inversely proportional to the weight of colloid employed in the composition, according to the equation:

$$D = Q \frac{V}{W} \qquad \text{(Equation I)}$$

wherein $D$ is the average diameter of the stabilized oil droplets (in centimeters), $V$ is the volume of the oil in the composition (in cubic centimeters) and $W$ is the weight of the solid colloid (in grams, on dry basis) in the dispersion. $Q$ is a constant whose value is characteristic of the particular colloid in a given aqueous medium. The value of $Q$ can be expressed as follows:

$$Q = C \frac{dt}{k}$$

wherein $d$ is the dry density of the solid colloid particle (in grams per cubic centimeter), $t$ is the thickness of the colloid particle (in centimeters) in a direction normal to the surface of the oil droplet when the colloid particle is at the liquid-liquid interface, and $k$ is the swelling ratio of the colloid particle, i.e., the ratio of the wet volume of the particle in the aqueous dispersion to its dry volume. $C$ is a constant whose value depends on the shape of the colloid particle and on the manner and degree of distribution of the colloid particles in the droplet surface. By substitution, equation I becomes:

$$D = C \frac{dtV}{kW} \qquad \text{(Equation II)}$$

The value of the constant $C$ in equation II depends upon the geometry of the colloid layer on the droplet surface, i.e., the shape of the colloid particle, its orientation relative to the droplet surface and the order of arrangement of the colloid particles relative to each other. Most colloids can be characterized in regard to shape as belonging to one of the class spheres, flattened circular discs and rectangles (not necessarily as to the actual shape of the particles but in regard to their effective shape). The value of $C$ may then be computed as follows (assuming a layer only one particle thick on the oil droplet surface):

For spheres, $C = \pi a$

For flattened circular discs, $C = 3/2 \pi a$ for rectangles (plates), $C = 6$

The value of the factor $a$ in the first two of the above expressions depends on the way in which the circular cross section particles are packed together in the layer of particles. For "cubic packing" the value of $a$ is about 1. For "close packing" the value of $a$ is about 1.15.

Thus, for dispersions wherein the colloid particles behave as spheres arranged on the droplet surfaces in a cubic packed layer one particle thick, becomes:

$$D = \frac{\pi dtV}{kW} \qquad \text{(Equation III)}$$

wherein the symbols have the significance previously given herein.

It is necessary that the colloidal solid particles be small relative to the droplets of oil and that the colloid be concentrated substantially at the liquid-liquid interface in a monolayer in order for the above relationships to apply.

If the solid colloidal particles do not have nearly identical dimensions, the average effective dimension can be estimated by statistical methods. For example, the average effective diameter of spherical particles can be computed as the square root of the average of the squares of the actual diameters of the particles in a representative sample.

The fact that the droplet size becomes very uniform during limited coalescence is attributed to a tendency of the solid colloidal particles to have a stronger affinity for larger than for smaller oil droplets. This comparative affinity is analogous to an adsorption phenomenon expressed by the relationship:

$$Ln\frac{Sr}{S} = \frac{2\sigma M}{dRTr} \quad \text{(Equation IV)}$$

where:

$Sr$ is the escaping tendency of a particle from a surface of radius $r$ (e.g., the radius of a droplet);

$S$ is the escaping tendency from a flat surface;

$\sigma$ is the interfacial tension;

$M$ is the molecular weight of the adsorbed particle;

$d$ is the density of the adsorbed particle;

$RT$ are the gas constant and the absolute temperature.

Extension of the adsorption theory to the phenomenon of limited coalescence accords with the observation that the "escaping" tendency of the solid colloidal particles from the smaller droplets is greater than from the larger, droplets, thus making the larger droplets more stable. The smaller droplets are correspondingly less stable to coalescence, thereby leading to further coalescence of the smaller droplets and the formation of droplets having very uniform and limited maximum size. This adsorption theory also predicts that the solid colloidal particle should have a very high "molecular weight." In the adsorption equation (equation IV), the variation of escaping tendency with variations in radius of adsorption surface ($r$) is directly proportional to $M$, the molecular weight of the adsorbed particle. When the value of $r$ is large, as it is in visible droplets, the value of $M$ must also be large. Thus, for droplets of radius in the order of 0.1 cm., the value of "molecular weight" of the solid particle would have to be from about $10^6$ to $10^8$ or larger in order for the affinity of the solid particles for larger droplets to be appreciably greater than for smaller droplets. The value of from $10^6$ to $10^8$ for the "molecular weight" of the adsorbed solid colloid particle is in agreement with the value of 0.01 micron ($10^{15}$ cm.) hereinbefore given as the minimum value of the range of dimensions of suitable solid colloid particles. Obviously, in many instances, the solid colloid particle is not a single molecule and in such instances the "molecular weight" of the solid colloid particle is the sum of the molecular weights of its component molecules. The larger is the size of the solid colloid particle, within the stated range, the more the affinity of that particle for the oil droplet depends on the radius of curvature of the surface of the droplet and the more narrow is the droplet size distribution in the stable, limitedly coalesced dispersion, i.e., the more uniform is the size of the oil droplets and the polymer globules, other things being equal.

Polymer beads or globules having a particular size can be prepared by this method by preparing a dispersion of droplets of monomeric polymerizable liquids having a corresponding particular size. If the values required by equation II are known or determinable, namely, the dry density, the swelling ratio, the average effective thickness of the solid colloidal particles and the manner of their distribution on the droplet surface, then the weight thereof required to prepare specific, desired sized droplets of monomer liquid in a given recipe can be readily computed. However, the present method can be employed to advantage even if such values are not known. In such instances, a simple preliminary test can be carried out in which a known volume of a polymerizable liquid is vigorously agitated with an aqueous suspending medium containing a known but arbitrarily selected quantity of a solid colloidal material capable of producing limited coalescence of the dispersed droplets. After such vigorous agitation and after a period of quiescence, the average diameter of the resulting stable droplets can be determined. This test establishes the relationship between the average diameter of the dispersed droplets and the weight of the solid colloidal material in the recipe. From this preliminarily established relationship, the weight of such colloid required to prepare droplets of such monomer having a different average diameter can readily be determined since the average diameter of the stable droplets is inversely proportional to the weight of solid colloid, other things being equal. Algebraically, this can be stated as:

$$D_1 W_1 = D_2 W_2 = D_3 W_3 \text{ etc.}$$

where the symbols $D$ and $W$ have meanings as before stated.

Having been prepared in the manner described above, the droplets are substantially stable against further coalescence but usually tend either to rise or to sink in the aqueous medium according to whether the density of the oil droplets is less than, or greater than, the density of the aqueous medium. If desired, the stable coalesced dispersion can be allowed to "cream," i.e., to undergo a concentration of the dispersed phase by gravitational separation from a part of the suspending medium. A part of the aqueous suspending medium can then be withdrawn, for example by decantation, leaving a more concentrated dispersion having a greater portion of polymerizable monomer liquid relative to the aqueous suspension medium.

In the practice of this invention, it is usually beneficial to treat the uniform droplet suspension prepared as described above to render the suspension stable against congregation of the oil droplets.

This further stabilization is accomplished by gently admixing with the uniform droplet dispersion an agent capable of greatly increasing the viscosity of the aqueous liquid. For this purpose, there may be used any water-soluble or water-dispersible thickening agent that is insoluble in the oil droplets and that does not remove the layer of solid colloidal particles covering the surface of the oil droplets at the oil-water interface. Examples of suitable thickening agents are sulfonated polystyrene (water-dispersible, thickening grade), hydrophilic clays such as Bentonite, digested starch, natural gums, carboxy-substituted cellulose ethers and the like. Often the thickening agent is selected and employed in such quantities as to form a thixotropic gel in which are suspended the uniform-sized droplets of the oil. In other words, the thickened liquid generally should be non-Newtonian in its fluid behavior, i.e., of such a nature as to prevent rapid movement of the dispersed droplets within the aqueous liquid by the action of gravitational force due to the difference in density of the phases. The stress exerted on the surrounding medium by a suspended droplet is not sufficient to cause rapid movement of the droplet within such non-Newtonian media. Usually, the thickener agents are employed in such proportions relative to the aqueous liquid that the apparent viscosity of the thickened aqueous liquid is in the order of at least 500 centipoises (usually determined by means of a Brookfield viscosimeter using the No. 2 spindle at 30 r.p.m.). The thickening agent is preferably prepared as a separate concentrated aqueous composition that is then carefully blended with the oil droplet dispersion.

The resulting thickened dispersion is capable of being handled, e.g., passed through pipes, and can be subjected to polymerization conditions substantially without mechanical change in the size or shape of the dispersed oil droplets.

The resulting dispersions are particularly well suited for use in continuous polymerization procedures that can be carried out in coils, tubes and elongated vessels adapted for continuously introducing the thickened dispersions into one end and for continuously withdrawing the mass of polymer beads from the other end. The polymerization step is also practiced in batch manner.

There are various additaments which may be made to the polymerization system. For example, encapsulation of a blowing agent is obtained where the initial monomer charge contains a polymer dissolved therein, for example, 10–15 percent by weight polystyrene is readily dissolved in methyl methacrylate and is polymerized in accordance with the examples of this application. Stabilizers, lubricants and similar substances which oftentimes are desirably incorporated into polymeric materials may be added with the monomer or blowing agent. However, only those materials which do not adversely effect the polymerization rate or the surface-active materials are desirable.

The order of the addition of the constituents to the polymerization usually is not critical, but beneficially it is more convenient to add to a vessel the water, dispersing agent, then the blowing agent to the monomer, and incorporated the oil-soluble catalyst to the monomer mixture, and subsequently add with agitation the monomer phase to the water phase. The blowing agent or raising agent must be present in a proportion which exceeds the solubility of such an agent in the polymer formed. This level usually is about 20 to 30 weight percent and, beneficially, is not less than about 20 volume percent. When suitable blowing agents having desirable solvent characteristics for the monomer system being utilized are employed in quantities less than about 20 volume percent, that is, based on the volume of the oil phase, separation frequently fails to occur and particles smaller in diameter than about 40 microns do not expand on heating.

Generally, for most applications, it is desirable to prepare a bead having an extremely small diameter such as from about 1 micron to about 50 microns and, advantageously, between about 2 and about 10 microns. Such beads or particles having a small diameter are readily molded into shaped articles having a smooth uniform texture, excellent insulation value, and high strength. Small particles are readily dispersed in gases such as air to prepare plastic smoke or fog. However, if desired, larger particles are readily prepared by utilizing a suitable suspending agent. Beneficially, on polymerization of a droplet of the desired size, the monomer, or monomers, as the case may be, polymerize to form a polymer shell such as the shell 12 of FIG. 1 surrounding a distinct and separate liquid phase of the blowing agent which is forced out of the monomer-blowing agent mixture of the bead as polymerization progresses.

Particles having symmetrical encapsulation of the liquid raising agent and diameters of from about 0.5 to 2 microns are particularly advantageous for the preparation of expandable coatings and like applications where thin expandable coatings are desired. Such particles are also particularly useful for the preparation of aerosols or plastic fog or smoke.

Generally, in order to prepare the symmetrical beads as shown in FIG. 1, it is desirable to incorporate within the monomer mixture copolymerizable polar systems, for example, if nonpolar monomer is being polymerized such as styrene, in order to assure that a majority of the particles produced from the polymerization have a uniform wall thickness, it is generally desirable to incorporate from about 1 percent by weight of the monomer to about 10 percent by weight of the monomer of a copolymerizable polar system such as methyl methacrylate, acrylic acid, fumaric acid, vinyl acetate, and the like.

When polymeric materials are utilized which have softening points below about 50° Centigrade, such as polyacrylates or acrylate copolymers which have a plasticizing monomer incorporated therein such as, for example, 2-ethylhexylacrylate, careful handling of the product is required. After polymerization in a pressure vessel if the product is to be isolated as an unexpanded particle the temperature of the reaction mixture, and the atmosphere in which it is being handled, must be at least about 5° below the softening temperature of the polymer. Otherwise, expansion will occur when the pressure is released from the polymerization vessel. Beneficially, in many instances where the desired product is the expanded bead, the polymerization vessel may be vented at a temperature above the softening temperatures of the polymer and a slurry of expanded particles obtained which are readily separated from the liquid by flotation and dried by centrifugation and similar conventional methods.

In utilizing styrene type monomers, particularly beneficial and advantageous are the copolymers of styrene with from about 1 to about 4 percent by weight methacrylic acid, copolymers of styrene with about 10 to about 80 percent acrylonitrile. These compositions, when polymerized in accordance with the invention, provide a product which consists of about 100 percent spherical particles having symmetrically encapsulated therein a blowing agent. Also advantageous are those styrene copolymers which provide symmetrical encapsulation in at least 80 percent of the particles prepared. These polymers are copolymers of styrene with from about 15-40 percent by weight of vinyl benzyl chloride, also copolymers of styrene and from about 1 to 8 percent by weight of acrylic acid. Copolymers of styrene and about 2-10 percent of acrylonitrile also provide a product which shows over 80 percent symmetrical encapsulation. At least 80 percent symmetrical encapsulation is achieved in utilizing a polymer of acrylonitrile with from about 7 to about 60 percent by weight of vinylidene chloride. Vinyl benzyl chloride and copolymers of orthochlorostyrene with from about 1 to about 8 percent of acrylic acid also provide symmetrical encapsulation. Typically, if particles generally in accordance with FIG. 4 are to be prepared, it is advantageous to utilize monomers such as styrene which results in a major portion of the resultant particles having asymmetric encapsulation which, on heating to a suitable temperature, form generally cuplike particles of FIG. 4.

Particularly beneficial and advantageous for the preparation of spherical particles having a blowing agent symmetrically encapsulated are such monomer compositions as methyl methacrylate, copolymers of methyl methacrylate containing up to about 20 percent by weight of styrene, copolymers of methyl methacrylate and up to about 50 percent by weight of the combined monomers of ethyl methacrylate, copolymers of methyl methacrylate, and up to 70 percent by weight of methyl methacrylate, and up to 70 percent by weight of orthochlorostyrene. These compositions, when utilized in accordance with the invention, provide a product which consists substantially of 100 percent of the particles showing symmetric encapsulation. Also advantageous and beneficial are those compositions which provide a product which has an excess of about 80 percent of the product as symmetrically encapsulated blowing agents. Methyl methacrylate materials comprising methyl methacrylate containing up to about 50 percent by weight of acrylonitrile, copolymers of methyl methacrylate containing up to about 20 percent paratertiary butylstyrene, polymers of methyl methacrylate with up to about 40 percent vinyl acetate, and polymers of methyl methacrylate with up to about 20 percent butyl acrylate.

Frequently it is beneficial to utilize in the practice of the present invention a difunctional monomer or cross linking agent which serves to increase the melt or flow viscosity of the polymeric composition at temperatures sufficiently high to cause volatilization of the blowing agent and subsequent deformation of the originally formed sphere into a larger hollow sphere. Such cross-linking agents are well known in the art and beneficially are incorporated into the polymerization system in small quantities in accord with well-known practice. Typical cross-linking agents are divinyl benzene which may be utilized up to about 0.6 weight percent with monomers such as methyl methacrylate, styrene and their copolymers with each other or with other vinyl monomers. Also, other suitable cross-linking agents include ethylene glycol dimethacrylate, divinyl toluene, and the like.

In the preparation of expandable particles in accordance with the invention, usually it is most advantageous to prepare them by polymerizing the monomeric materials to a relatively low molecular weight if maximum expansion of the particles is desired. For example, greater expansion under similar conditions will be obtained from particles prepared utilizing 4 percent by weight based on the monomer of a free radical generating catalyst than if 1 percent by weight of the catalyst is employed. The lower molecular weight material usually tends to expand to greater volume than does the higher molecular weight material. This is presumed to be due to the difference in the flow characteristics of the thermoplastic resins as the molecular weight varies. If the polymerization conditions are such that a cross-linked nonthermoplastic resin is prepared there can be little or no expansion. If the opposite extreme of molecular weight is employed wherein a very low molecular weight resin is utilized, expansion can occur but the product usually is of relatively low strength and oftentimes of limited value. If the diffusion rate of a blowing agent through a polymer varies with the composition of the polymer as well as its molecular weight the optimum quantity of blowing agent to be incorporated within a particular particle for expansion will vary accordingly. Thus, if particles of a given diameter are prepared, some from a polymer having a relatively high diffusion rate of the blowing agent through the cell wall a greater quantity of blowing agent will be required than in a particle of similar dimensions and having similar thermoplastic properties. This optimum ratio will vary as the particle diameter varies. A small particle will generally require a larger quantity of blowing agent than will a larger particle as the thickness of the wall initially is less and on expansion becomes proportionately thinner. Thus, the diffusion rate through the wall of a small particle having a given polymer to blowing agent rate ratio is significantly greater than that for a particle having three or four times its diameter. Thus, in the instance of particles having a relatively high percentage of blowing agent which are small in diameter substantially less expansion can be expected than for a particle initially containing less blowing agent and more polymer. That is, the optimum polymer raising agent ratio for each polymer blowing agent combination is dependent on particle size. For example, methyl methacrylate particles containing neopentane and having a diameter of about 10 microns have for optimum expansion approximately a ratio of 1:1 blowing agent to polymer.

However, frequently is is desirable to prepare particles which do not expand to give a symmetrical particle such as is illustrated in FIG. 2 and it is desired to prepare nonexpanding particles wherein the liquid occlusion is not centered within the drop but disposed more toward one side of the particle. This is most readily accomplished by utilizing a polymerization system employing nonpolar monomers. The nonsymmetrical particles, such as are illustrated in FIG. 3, are particularly desirable and advantageous for the preparation of the expanded urnlike bodies of FIG. 4. The urnlike bodies provide an extremely small receptacle which is readily filled with a liquid or liquid dispersion, subsequently dried by conventional means such as centrifugation and the judicious application of warm air to result in a body such as is illustrated in FIG. 5, wherein a liquid is incorporated within the cavity, the cavity is open and exposed to the atmosphere, and yet the outer wall of the particle is dry. Thus, there is provided a unique and beneficial carrier for liquids which may be handled in the form of a substantially free-flowing powder and is particularly advantageous for the incorporation of additaments into plastic masses in which the additament oftentimes is not readily dispersible and yet substantially uniform dispersion is required. Such particles also serve other unique functions such as dye carriers wherein a dispersion of the dye in a liquid is incorporated within the cavity, the particles dried to remove all moisture, and the outer surface polished by tumbling, thus resulting in a mass of small particles each containing a portion of dye and presenting a clean exterior surface. If such dye is a water-soluble dye, the particles are readily added to water and the dye readily dissolved therefrom quickly.

Expanded beads or particles in accordance with the present invention are readily incorporated in coatings. This oftentimes is most readily done by prefoaming or expanding the beads into individual spherical particles and subsequently admixing them in a suitable binder. Such a binder can be one of the lacquer type, that is, a binder dissolved in a solvent, or it can be an aqueous dispersion of a film-forming polymeric material or even an aqueous solution of a film-forming material. The precise and particular type of binder or vehicle for the expanded particles will depend upon the particular composition of the expanded particle which is utilized. Generally, the vehicle should be of such nature that is does not chemically attack or physically deform the expanded particles and allows them to remain in the finished coating as distinct physical entities. The relative amount of the binder employed in the vehicle will be dependent upon the properties desired in the resultant coating. For example, if a porous bulky coating is desired, the proportion of binder is maintained sufficiently small that the particles are adhered together primarily at their points of contact and insufficient binder is provided to fill the interstitial spaces between the particles. If an impervious coating is desired, a larger quantity of binder is employed which results in a plurality of hollow spherical particles dispersed within a matrix of the binder. In choosing a vehicle for a particular polymeric composition of expanded bead, it is necessary that the vehicle should not exert a strong solvent action upon the particle. Otherwise the insulating and other desirable properties of the coating which are achieved by using the hollow beads is destroyed and the resultant coating will be no more than that which is achieved by dissolving an equivalent amount of polymer in the vehicle and depositing it as a lacquer or crushing the beads prior to dispersal in the vehicle. Coatings which utilize the hollow spheres tend to be excellent light dispersing media as they provide a larger number of internal surfaces, each of the surfaces being curved.

Suitable coatings formulated with expanded particles in accordance with the invention provide thermal insulation as well as a generally attractive appearance. The thickness to weight ratio of such coatings is generally substantially and significantly greater than usual coating materials thus providing insulation and resistance to degradation by sunlight and similar radiation. Beneficially temporary coatings are easily prepared by utilizing a water-soluble binder. By way of illustration, the expanded particles may readily be dispersed in an aqueous system utilizing a water-soluble polymeric material. For example, expanded particles in accordance with the invention are readily dispersed in an aqueous system containing a water-soluble polymeric material such as water-soluble hydroxypropyl methyl cellulose, sodium carboxy cellulose, gum agar, and the like. As with other coatings utilizing the particles of the invention, it may be applied by spraying, dipping, rolling, brush and the like and on drying provides thermal insulation as well as protection from radiation. However, when the coating is no longer needed it is readily removed by flushing with water. Among the permanent coatings, one may utilize a solution of a thermosetting material such as a phenol formaldehyde resin in water or suitable solvent which provides a coating that is not readily attacked by either water or organic solvents. Such insulating coatings are advantageously used in many applications including piping, duct work, walls, and the like. The water-soluble coatings may be utilized for temporary frost protection on plants such as fruit trees and flowers.

Alternately, the unexpanded particles are readily incorporated into a suitable vehicle containing a binder which must meet the limitations of a vehicle for expanded particles but in addition must be thermoplastic. Where the unexpanded particles are employed, in a coating with thermoplastic binder heating of the dried coating causes the particles to expand and provide a foamed coating. Advantageously, such an expandable coating can readily be used in a wide variety of applications including insulating laminated bags, frozen food containers, ice cream and cold drink containers as well as hot drink containers. Such foamable coatings are particularly advantageous and beneficial wherein attractive texture effect is desired, as they are readily applied in such a manner as to give a nonuniform coating thickness; for example, if they are incorporated in a latex paint formulation and applied to a surface utilizing a roller having a long nap, the coating has a short term variation in thickness which on expansion gives rise to a corresponding variation in the expanded thickness of the coating. The binders utilized with the expandable particles in accordance with the invention must be thermoplastic within a temperature range suitable to the particular particle employed. That is, for example, if a thermoplastic resinous particle containing as a distinctly separate liquid phase an expandable liquid or blowing agent is placed within the coating which has a softening point which is substantially less than that of the particle, that is from about 70°-100° Centigrade lower than the softening point of the particle resin a relatively poor foamed coating will result. In such a case, the temperature required to promote expansion or release of blowing agent by the particles is sufficiently high that the viscosity of the binder oftentimes will be too low for satisfactory foaming to occur. Because of the relatively low viscosity at the high temperature, the blowing agent which is released from rupturable particles in accordance with the invention diffuses rapidly through the binder material as it is cooling and the resultant foam volume is generally less than that which could be obtained if a more suitable binder is utilized. Although this is beneficial, certain exceptions exist, particularly in some of the plasticized polyvinyl chloride compositions which are relatively impervious to the blowing agent and whose flow viscosity does not change as rapidly with temperature as do binders such as the sarans. The expandable coatings and coatings containing expanded particles are readily applied by the common coating techniques. In coatings where the expanded particles are utilized, some precautions must be observed to maintain uniformity of the coating composition as the hollow particles exhibit a tendency to float. This tendency to stratify is somewhat less than might be generally presupposed particularly in cases where the diameter of the particles is relatively small, that is, below about 50 microns. The viscosity of such coating mixtures and Brownian movement tends to make stratification a slow process. Usually in the preparation of expandable coatings in accordance with the present invention it is desirable to maintain a sufficient quantity of binder in the coating that on expansion it will remain a coherent, adherent protective layer. However, advantageously by reducing the volume of the binding material to a point where it is sufficient to bind the unexpanded particles but insufficient to bind the expanded particles, a coating composition of this type provides an excellent temporary coating which can readily be removed by the application of heat. By way of illustration, if a metal surface is to be protected by a temporary coating which is to be removed without the application of solvent or other liquid means a coating of expandable particles in sufficient binder to maintain a coherent coat is applied to the surface. When the coating is to be removed, the temperature is raised to the point where the spherical particles expand. If a relatively nonpolar binder is employed, that is, one with less than maximum possible adhesion to the metal substrate, the binder will preferably adhere to the particles as they expand. As the volume of the binder present is insufficient to maintain a coherent film and the coating falls away as a dust leaving a clean metallic surface, the expandable coatings of the present invention inherently are intumescent. If a raising or expanding agent such as a halogenated material is employed, significant fire retardant properties are introduced. The foamable coatings, if suitably prepared utilizing halogenated materials, are found to be excellent fire retardants.

Coating compositions utilizing expandable particles are also beneficially employed for the fabrication of laminates. For example, a laminate is readily prepared by coating a paper with an expandable coating, positioning the two portions of the coated paper with their coatings in contact and heating the sheets to a temperature sufficient to cause the coatings to expand the fuse together. The resultant laminate is strong, light in weight, and exhibits excellent insulating properties. Similar laminates are readily prepared utilizing metallic foils, synthetic resinous film, various papers, wood veneer, and the like. Sheets having an expandable coating in accordance with the present invention may be treated by the selective application of heat to provide various decorative patterns. For example, a sheet of material having an unfoamed coating on the surface may be selectively treated with heat to prepare limited and patterned foamed portions. This is readily accomplished by using a heated stylus applied to the surface of the coated sheet remote from the coating or by the application of a heated patterned platen. Various designs and indicia are readily generated. Particularly advantageous is the use of a colored base sheet employing a clear coating formulation. On heating, the foamed portions appear white or slightly tinted with the color of the base sheet and stand out in sharp contrast thereto. Alternately a colored coating composition may be used and on foaming the intensity or depth of the color is greatly reduced. Alternately, a foamed coating may be treated by the selective application of heat to emboss it and generate decorative patterns. For example, if a sheet having a foamed coating thereon has a black surface underneath the foam, it will appear white, provided of course the foam is of adequate thickness. On the application of a heated stylus or heated type the foam particles collapse and the coating is clear and the result appears as a black on white.

The expandable particles of the present invention are advantageously employed in admixture with heat setting adhesives, particularly when adhesives are utilized on relatively uneven surfaces such as wood. When the adhesives containing a portion of the expandable particles are placed between two surfaces to be joined and heat applied thereto the expansion of the particles increases the bulk of the adhesive and forces it into contact with the surfaces to be joined. Thus, the advantages of conventional foaming adhesive technique are gained with the additional benefit that the adhesive may be applied in thin layers and still expand in the desired location. In a similar manner, the expanded coatings may be utilized as adhesives themselves. If a tape or sheet is coated on both sides with expandable coatings and positioned between surfaces to be joined, heat applied, the particles expand, bond together and to the surfaces, thus providing in effect not only an adhesive but a gasket. Advantageously, the expandable particles of the present invention may beneficially be employed for the preparation of expandable resinous compositions. If expandable particles of the present invention are incorporated into a self-reacting material which is exothermic, the heat of the reaction may be sufficient to expand the particles while the exothermic resinous substance is curing, thus low density foamed resinous material is readily prepared from materials which are not easily or readily foamed by conventional methods. As can be readily realized, the amount of heat liberated by the reactive exothermic material will control in part the amount of expansion. If with the chosen composition the degree of expansion is not as much as could be reasonably expected, it may be desirable to raise the temperature of the resin-forming material prior to its expansion. A generally similar technique is set forth in U.S. Pat. No. 2,985,905 wherein expandable particulate material is utilized in the preparation of a less homogenous product than can be obtained utilizing the monocellular liquid-raising agent containing particles of the present invention. Particularly advantageous and beneficial as exothermic matrix within which to incorporate the particles of the present invention are the epoxy resin systems. Heretofore there has been no convenient manner in which rigid or flexible epoxy resin foam could be generated having a low density such as in the range of 1-3 pounds per cubic foot without the use of pressure equipment to restrain the mixture until foaming is desired. Utilizing the particles of the present invention, a curable epoxy resin mixture may be filled with expandable particles of the present invention, then suitable hardener may be incorporated to cause the epoxy resin to react and generate sufficient heat to expand the particles and cure into a rigid body. Alternately advantageous and beneficial compositions are achieved when less exothermic materials are employed. For example, if an epoxy resin formulation is prepared which cures only to the B stage, that is, it is solid thermoplastic and will cure to a crosslinked material on further heating, a powder can be obtained which may be used in fluid bed coating or sprayed onto hot surfaces where it will expand on the application of heat. Advantageously, epoxy resin expandable particle compositions are particularly useful for encapsulation of structures such as electronic circuitry and the like. Epoxy resin foam compositions prepared utilizing the particles of the present invention have low dielectric constants, that is, in the range of about 1.07 to 1.08, a satisfactory dissipation factor for most applications, that is, a dissipation factor of about 0.0025 and a volume resistivity substantially greater than 1013 ohms cm². Expandable coatings in accordance with the present invention are advantageously utilized in the preparation of cups for hot drinks and the like. Such cups are readily prepared by coating the paper form which the cups are to be prepared or alternately coating the cups after fabrication. By utilizing an aqueous dispersion of a film-forming latex together with the expanded particles of the invention, cups may be prepared which are readily stackable and occupy little if any more space than is normally occupied by conventional paper cups. Usually cups having a foamable coating may be fabricated from lighter paper or plastic, that is, thinner paper or plastic, consequently weigh less and occupy less space. Cups having an expandable coating are readily prepared for service by subjecting to heat immediately prior to use and after they are unstacked. One particularly advantageous embodiment of the invention incorporates a cup formed form a thin wall sheet and having on at least a portion of its outer surface a coating which will foam at a temperature of about 130° Fahrenheit. With a coating of this nature, it is possible to expand the coating to give an insulating layer by a simple addition of a heated liquid to the container. Thus, in a dispenser for hot beverages such as coffee and the like, it is only necessary that the hot liquid be added to the cup in order for the insulating coating to appear. The disadvantages of a prefoamed coating are avoided as the necessity of pretreating the cups in an oven or the like prior to serving. Generally low-temperature foaming coatings are most advantageously prepared utilizing either the particles showing symmetrical encapsulation or asymmetrical encapsulation together with a film-forming lacquer or preferably an aqueous latex of a film-forming polymer which has a relatively low transmission rate for the volatile expanding agent utilized in the particles.

Beneficially, expandable or blowing agent containing particles which are relatively soft and indeed which may never exist under normal ambient conditions as individual discrete expanded bodies at a temperature above their softening point are readily utilized. Typical compositions which are beneficially employed for this application are those polymethyl acrylate, methyl methacrylate-methyl acrylate copolymers in about a 1:4 ratio in the copolymer and utilizing neopentane as a blowing agent, styrene butadiene copolymers having from about 20–60 parts of styrene and about 80–40 parts butadiene and the like. The softer copolymers generally do not have extended shelf life or stability, that is, there is a relatively rapid tendency of these compositions to lose their blowing agent to the surrounding atmosphere. However, when admixed with a material such as vinylidene chloride, copolymers such as those film-forming materials containing from 50–90 percent vinylidene chloride with another monomer copolymerizable therewith, very satisfactory expandable coatings are obtained. The softer materials also provide foamable coatings if extreme shelf stability is not required. Such particles, although not readily expanded as individual particles when deposited on a convenient substrate form a continuous film which, on further heating, will form a foamed coating.

Advantageously, expandable thermoplastic resinous beads having a volatile liquid incorporated therein may be utilized as a means of handling or adding a volatile component to another system. For such applications, it is generally advantageous to maintain as high a proportion by weight of the encapsulated blowing agent in the particles as is possible. Beneficially, such particles are prepared in a substantially identical manner with the exception that considerably less polymerizable monomer is utilized. The precise proportion of polymer to volatile liquid employed will depend to a major extent on the desired size of the particle and the diffusion rate of the blowing agent through the particle wall. If the particles are to be utilized in such a manner that they are transferred directly from a sealed container to a suitable system such as, for example, if they are being added to a resinous matrix such as an epoxy resin, the diffusion rate of the blowing agent from the bead in a normal atmosphere may be relatively high as the time required to transfer particles from the sealed container to their ultimate destination will be small and any blowing agent loss will be proportionately low. However, if longer term shelf stability is desired or necessary, the polymer shell must be proportionally thicker for a given resin and offer suitable resistance to the diffusion of the blowing agent from the particle. Oftentimes, it is advantageous to utilize larger particles, that is, in the 50–1000 micron range; for such applications, the larger particles require less polymer per volume of blowing agent for identical loss of blowing agent rates.

Generally, in preparing particles with high proportions of blowing agent, that is, in excess of about 50 percent, and more particularly in the range of 75–95 percent by weight of the blowing agent, it is often desirable to employ a monomer system which on polymerization results in a cross-linked polymer shell. Some of the many polymers which are found to be satisfactory for the encapsulation of neopentane, neohexane, isopentane, fluorocarbons and the like hereinbefore designated blowing agents are: (a) a copolymer of styrene, methacrylic acid and divinyl benzene in a weight ratio of 88:2:10; (b) a copolymer of 90 parts of methyl methacrylate, 10 parts of propylene glycol dimethacrylate; and (c) a copolymer of 60 parts of vinylidene chloride, 30 parts of acrylonitrile, and 10 parts of diallyl phthalate are very satisfactory for encapsulating quantities of blowing agent which are up to 85–90 percent of the total weight of the particle. Contrary to the normal expectations, such copolymers are generally not rigidly cross linked, and on heating are capable of expansion. However, usually they do not expand to the same degree as a material without the difunctional monomer.

The invention is further illustrated, but not limited by the following examples.

EXAMPLE 1

A polymerization reactor equipped with an agitator was charged with 100 parts of deionized water and 15 parts of a 30 weight percent colloidal silica dispersion in water. The colloidal silica dispersion was 30 weight percent solids and available under the trade name of "Ludox HS." To this mixture was added 2.5 parts of a 10 weight percent aqueous solution of a copolymer prepared from diethanol amine and adipic acid in equimolar proportions by carrying out a condensation reaction to give a product having a viscosity of about 100 centipoises at 25° Centigrade. One part of a solution containing 2.5 weight percent potassium dichromate was added. The pH of the aqueous solution was adjusted to 4 with hydrochloric acid. Methyl methacrylate was utilized as the monomer. An oil phase mixture was prepared utilizing 100 parts of methyl methacrylate and containing 20 weight percent neopentane (27.6 volume percent based on the total volume of the monomer neopentane mixture) and 0.1 part of benzoyl peroxide as a catalyst. The oil phase mixture was added to the water phase with violent agitation supplied by a blade rotating at a speed of about 10,000 r.p.m. The reactor was immediately sealed and a portion sampled to determine the particle size. The droplets appeared to have diameters of from about 2 to about 10 microns. After the initial dispersion, the reaction mixture was maintained at a temperature of about 80° Centigrade for a period of 24 hours. At the end of this period, the temperature was lowered and the reaction mixture had the appearance of a white, milky liquid similar to a chalk-white milk. A portion of the mixture was filtered to remove the beads and the beads subsequently dried in an air oven at a temperature of about 30° Centigrade. A portion of the dried beads was heated in an air oven at a temperature of 150° Centigrade for about 3 minutes. Upon heating, the beads showed a marked increase in volume. Microscopic examination of the beads prior to foaming indicated beads having diameters of from about 2 to about 10 microns and having dispersed therein a distinct spherical zone which appeared to contain liquid and a small vapor space. The beads which had been heated were examined microscopically and were found to have diameters of from about two to five times the diameter of the original bead and to have a relatively thin, transparent wall and a gaseous center, i.e., a monocell.

EXAMPLE 2

In a manner similar to example 1, beads having diameters from about 2 to 10 microns were prepared utilizing a monomer mixture of 90 parts of methyl methacrylate and 10 parts styrene. The volume percent of neopentane was 27.6. The beads prepared in this manner were symmetrical and readily expanded on heating to a temperature of about 120° to about 130° Centigrade to from monocells.

EXAMPLE 3

In a manner similar to example 1, with the exception that a monomer mixture comprising 80 percent by weight of methyl methacrylate and 20 percent by weight of styrene, were utilized with 27.5 volume percent (20 weight percent) of the oil phase of neopentane. The resultant beads had a diameter of from about 2 to 30 microns and contained a liquid center encapsulated therein which was generally concentric with the outer cell of the beads. On heating to a temperature of about 130° Centigrade, the beads expanded to form monocells about two to five times the original diameters of the beads.

EXAMPLE 4

In a manner similar to example 1, with the exception that a monomer mixture of methyl methacrylate containing 0.05 percent by weight of divinyl benzene was admixed with 23 parts by weight of neopentane (31.3 volume percent). From the polymerization, there were recovered beads having diameters of from about 2 to about 10 microns. Within each bead was symmetrically encapsulated a small quantity of liquid neopentane. On heating the beads to a temperature of about 150° Centigrade, the beads expanded to a diameter of from about 6 to about 30 microns.

EXAMPLE 5

Utilizing the procedure set forth in example 1, with the exception that a monomer mixture comprising about 90 parts by weight of methyl methacrylate, 10 parts by weight ethyl methacrylate, 0.05 parts by weight of divinyl benzene, and 23 percent by weight (31.3 volume percent), of the oil phase of neopentane, there was obtained a product in the form of small beads having diameters of from about 2 to about 10 microns. Within each of the beads was encapsulated a small volume of liquid neopentane. When heated to a temperature of about 120° Centigrade, the beads expanded to a diameter of from about 6 to about 30 microns.

EXAMPLE 6

Utilizing the procedure set forth in example 1, with the exception that a monomer mixture comprising about 70 parts by weight of methyl methacrylate, 30 parts by weight of ethyl methacrylate, 0.05 part by weight of divinyl benzene, and 23 percent by weight (31.3 volume percent), of the oil phase of neopentane, there was obtained a product in the form of small beads having diameters of from about 2 to about 5 microns. Within each of the beads was a centrally disposed volume of neopentane. When heated to a temperature of about 110° Centigrade, the beads expanded to a diameter of from about 4 to about 15 microns.

EXAMPLE 7

Utilizing the procedure set forth in example 1 with the exception that a monomer mixture comprising about 50 parts by weight of methyl methacrylate, 50 parts by weight ethyl methacrylate, 0.05 part by weight of divinyl benzene, and 23 percent by weight (31.3 volume percent), of the oil phase of neopentane, there was obtained a product in the form of small beads having diameters of from about 2 to about 10 microns. Within each of the beads was encapsulated a small volume of liquid neopentane. When heated to a temperature of about 100° Centigrade, the beads expanded to monocellular particles a diameter of from about 4 to about 30 microns.

EXAMPLE 8

The procedure of example 1 was repeated, the exception being that a monomer mixture was employed comprising 40 percent by weight of methyl methacrylate and 60 percent by weight of ethyl methacrylate. 0.05 percent by weight, based on the methyl methacrylate and ethyl methacrylate, of divinyl benzene was incorporated into the monomer mixture. The polymerization product was in the form of small beads having centrally disposed therein a distinct, separate liquid phase of neopentane. On heating a portion of the product to a temperature of about 100° Centigrade, they expanded to monocellular particles having a diameter of from about two to about five times the initial diameter.

EXAMPLE 9

The procedure of example 1 was repeated with the exception that the monomer mixture comprised 10 parts by weight of methyl methacrylate, 90 parts by weight of ethyl methacrylate, and 0.05 part by weight of divinyl benzene. Twenty-three weight percent (31.3 volume percent) based on the weight of the oil phase of neopentane was utilized. The product characteristics were substantially similar to those set forth in example 8.

EXAMPLE 10

The procedure of example 1 was followed with the exception that 100 parts by weight of ethyl methacrylate and 0.05 part by weight of divinyl benzene were utilized, together with 23 percent by weight (36.5 volume percent), of the oil phase of neopentane. Small beads having diameters of from about 2 to about 5 microns were obtained. The beads had asymmetrically encapsulated therein a distinct liquid phase of neopentane. On heating, particles were obtained similar to those of FIG. 4.

EXAMPLE 11

The procedure of example 1 was repeated with the exception that the monomer mixture comprised 90 parts of methyl methacrylate, 10 parts of o-chlorostyrene, and 0.05 part of divinyl benzene. This monomer mixture was admixed with 23 percent by weight (31.7 volume percent) of the oil phase of neopentane. The polymerized product was in the form of small beads having symmetrically encapsulated therein a distinct liquid phase of neopentane. On heating the beads to a temperature of about 130° Centigrade, the beads expanded to monocells having diameters of from about two to about five times the original diameter.

EXAMPLE 12

The procedure of example 1 was repeated with the exception that the monomer mixture comprised 40 parts of methyl methacrylate, 30 parts of o-chlorostyrene, and 0.05 part of divinyl benzene. This monomer mixture was admixed with 23 percent by weight (32.4 volume percent) of the oil phase of neopentane. The polymerized product was in the form of small beads having symmetrically encapsulated therein a distinct liquid phase of neopentane. On heating the beads to a temperature of about 140° Centigrade, the beads expanded to monocells having diameters of from about two to about five times the original diameter.

EXAMPLE 13

The procedure of example 1 was repeated, with the exception that the monomer mixture comprised 50 parts of methyl methacrylate, 50 parts of o-chlorostyrene, and 0.05 parts of divinyl benzene. This monomer mixture was admixed with 23 percent by weight (33.2 volume percent) of the oil phase of neopentane. The polymerized product was in the form of small beads having symmetrically encapsulated therein a distinct liquid phase of neopentane. On heating the beads to a temperature of about 150° Centigrade, the beads expanded to monocellular particles having diameters of from about two to about five times the original diameter.

EXAMPLE 14

The procedure of example 1 was repeated with the exception that the monomer mixture comprised 30 parts of methyl methacrylate, 70 parts of o-chlorostyrene, and 0.05 part of divinyl benzene (34.0 volume percent). This monomer mixture was admixed with 23 percent by weight of the oil phase of neopentane. The polymerized product was in the form of small beads having symmetrically encapsulated therein a distinct liquid phase of neopentane. On heating the beads to a temperature of about 160° Centigrade, the beads expanded to monocellular particles having diameters of from two to about five times the original diameter.

EXAMPLE 15

The procedure of example 1 was repeated with the exception that the monomer mixture employed comprised 10 parts of methyl methacrylate and 90 parts of o-chlorostyrene. With these monomers, there was employed 23 weight percent of the oil phase of neopentane (29.3 volume percent). The product was in the form of fine beads having concentrically contained therein a distinct and separate liquid phase of neopentane. On heating a portion of the product to about 160° Centigrade the beads expanded to monocellular particles having diameters of from about two to about five times the original diameter.

EXAMPLE 16

The procedure of example 1 was repeated with the exception that the monomer employed comprised 100 parts of o-chlorostyrene. With this monomer, there was employed 23 weight percent (35.3 volume percent) of the oil phase of neopentane. The product was in the form of fine beads having encapsulated therein a distinct and separate liquid phase of neopentane. On heating a portion of the product to about 160° Centigrade, the beads expanded to monocellular particles having diameters of from about two to about five times the original diameter.

EXAMPLE 17

The procedure of example 1 was repeated with the exception that the monomer employed was vinylbenzyl chloride and the quantity of neopentane utilized was 25 weight percent (35.4 volume percent) of the oil phase. The product obtained was in the form of fine beads having a diameter of from about 2 to about 10 microns and encapsulated within the beads was a distinct phase of liquid neopentane. On heating to a temperature of about 130° Centigrade, the beads expanded to monocellular particles having diameters from about two to about five times the original diameters.

EXAMPLE 18

A polymerization reaction was charged with 100 parts of deionized water and 15 grams of a 30 percent by weight colloidal silica dispersion. To this mixture was added 2½ parts of a copolymer prepared from diethanol amine and adipic acid in equimolar proportions to give a product having a viscosity of about 5 centipoises at 25° Centigrade. One part of a solution containing 2½ percent potassium dichromate was added to the polymerization reactor. The pH of the aqueous mixture was adjusted to 4 by addition of hydrochloric acid. Seventy-seven parts of a monomer mixture comprising 70 percent by weight of acrylonitrile and 30 percent by weight of vinylidene chloride was catalyzed with one-half to 1 percent of 2,2-azobisisobutyro nitrile. To this monomer mixture was added 23 weight percent (30.3 volume percent) based on the weight of the oil phase of neopentane. The reaction mixture was subjected to violent agitation by a blade rotating at a speed of about 10,000 r.p.m. A portion of the contents was sampled to determine particle size and the reactor immediately sealed. The monomer neopentane droplets appeared to have diameters ranging from about 2 to about 5 microns. The reaction mixture was maintained at a temperature of about 55° Centigrade for a period of 24 hours. Gentle agitation was maintained during this reaction period and at the end of the reaction period, the temperature of the mixture was lowered to about 30° Centigrade. The reaction mixture had a chalky-white appearance similar to milk. A portion of the mixture was filtered to remove the small beads and the beads subsequently placed in an air oven at a temperature of about 30° Centigrade. A portion of the beads was heated to a temperature of about 150° Centigrade for a period of about 2 minutes. At this temperature, the beads expanded and turned dark. The product, prior to heating, appeared under a light microscope to have a fine structure to the surface, and contained a liquid center of neopentane.

EXAMPLE 19

The procedure of example 18 was repeated with the exception that the monomer mixture comprised 60 parts of acrylonitrile and 40 parts of vinylidene chloride. The oil phase was 32 percent by volume neopentane. The product had an appearance similar to that of example 18.

EXAMPLE 20

The procedure of example 18 was repeated with the exception that the monomer mixture contained equal portions of acrylonitrile and vinylidene chloride. The oil phase was 32.2 percent by volume neopentane. The polymerization produce appeared as transparent beads having encapsulated therein a small portion of neopentane. On heating a portion of the product to a temperature of 150° Centigrade, the beads expanded to monocellular particles having diameters of from about two to about five times the diameters of the unexpanded particles and remained clear and transparent with no apparent discoloration.

EXAMPLE 21

The procedure of example 18 was repeated utilizing a monomer mixture comprising 40 percent by weight of acrylonitrile and 60 percent by weight vinylidene chloride. The oil phase was 33.2 percent by volume neopentane. On examination and evaluation, the product appeared substantially similar to that obtained in example 18.

EXAMPLE 22

The procedure of example 18 was repeated with the exception that the monomer mixture was comprised of 10 parts of acrylonitrile and 90 parts of vinylidene chloride. The oil phase contained 36.6 volume percent neopentane. The product obtained was in the form of fine beads. A portion of the product was heated to a temperature of from about 100 to about 150° Centigrade and expanded to form monocellular beads having a diameter of from about two to about five times the diameters of the unexpanded particles.

EXAMPLE 23

The procedure of example 1 was repeated utilizing methyl methacrylate containing 0.025 part of divinyl benzene and 23 weight percent (30.3 volume percent) of the oil phase of neohexane. Substantially similar results were obtained.

EXAMPLE 24

The procedure of example 1 was repeated wherein the monomer mixture consisted of 90 parts of methyl methacrylate, 10 parts of acrylonitrile and 0.025 part of divinyl benzene in admixture with 23 weight percent (29.8 volume percent) of the oil phase of neohexane. A product was obtained in the form of fine beads having encapsulated therein a volume of neohexane. On heating the portion of the product to a temperature of from about 110° Centigrade to about 170° Centigrade, the beads expanded to monocellular particles having diameters of from two to about five times the diameters of the unexpanded beads.

EXAMPLE 25

The procedure of example 1 was followed with the exception that the monomer mixture comprised 50 parts of methyl methacrylate, 50 parts of acrylonitrile and 0.025 part of divinyl benzene. Twenty-three weight percent of neohexane (28.4 volume percent) of the total oil phase was incorporated within the reaction vessel. The product was obtained in the form of small beads with a diameter of from about 2 to about 10 microns, and symmetrically disposed within the bead was a small occlusion of neohexane. On heating a portion of the product to a temperature of about 150° Centigrade, the beads expanded to form monocellular particles having diameters of from about two to about five times the diameters of the unexpanded beads.

EXAMPLE 26

The procedure of example 1 was repeated with the exception that the monomer mixture comprised 90 parts of methyl methacrylate, 10 parts of p-tertiary-butyl styrene, and 0.05 part of divinyl benzene, and 23 weight percent (29.9 volume percent) of the oil phase of neohexane was incorporated within the reaction mixture. The product obtained was in the form of fine beads having a diameter of from about 2 to about 10 microns. Microscopic examination revealed that included within the beads was a centrally disposed cavity containing neohexane. On heating the product to a temperature of from about 120° to about 150° Centigrade, the beads expanded to form monocellular particles having diameters of from about two to about five times the diameters of the unexpanded beads.

EXAMPLE 27

The procedure of example 1 was repeated with the exception that the monomer mixture comprised 70 parts of methyl methacrylate, 30 parts of p-tertiary-butyl styrene and 23 weight percent (29.6 volume per cent) of the oil phase of neohexane was employed. The product obtained was in the form of small beads having diameters of from about 2 to about 10 microns. Microscopic examination of the beads revealed that a majority of the beads contained a space having liquid neohexane therein which was not concentrically disposed with respect to the surface of the bead. In a minor portion of the beads, the neohexane inclusion was symmetrically disposed with respect to the exterior surface. A portion of the beads was heated to a temperature of about 130° Centigrade. The beads having the neohexane symmetrically encapsulated appeared to have diameters of from about 4 to about 30 microns and those having unsymmetrical encapsulation did not expand but ruptured, forming cup-shaped particles generally similar to FIG. 4.

EXAMPLE 28

The procedure of example 1 was repeated with the exception that the monomer mixture employed consisted of 80 parts of methyl methacrylate, 20 parts of vinyl acetate, and 0.05 part of divinyl benzene. Twenty-three weight percent (31.3 volume percent) of the oil phase of neopentane was incorporated within the reaction mixture. The product was recovered in the form of fine beads having a symmetrical encapsulation of neopentane within the bead and having a diameter of from about 2 to about 10 microns. A portion of the product was heated to a temperature of 110° Centigrade and expanded to form monocellular particles having diameters of from about 4 to about 40 microns.

EXAMPLE 29

The procedure of example 1 was repeated with the exception that the monomer mixture utilized 80 parts of methyl methacrylate, 20 parts of vinyl acetate and 0.05 part of divinyl benzene. Twenty-three weight percent, based on the total weight of the oil phase of neopentane (31.3 volume percent) was utilized. After polymerization, the product was separated and found to be a plurality of small monocellular beads having a diameter of from about 2 to about 10 microns. On heating a portion of the beads to a temperature of 110° Centigrade in air, the diameter increased from about 4 to about 40 microns. Microscopic examination of the beads prior to heating indicated symmetrical encapsulation of a portion of neopentane within the beads.

EXAMPLE 30

The procedure of example 1 was repeated with the exception that the monomer mixture employed was comprised of 60 parts of methyl methacrylate, 40 parts of vinyl acetate, and 0.05 part of divinyl benzene. Twenty-three weight percent (31.3 volume percent) of the oil phase of neopentane was utilized. The product was obtained as a plurality of fine beads having a generally translucent surface. Microscopic examination of the beads indicated that sufficient surface irregularities existed, that the central portion of the bead could not be observed. On heating a portion of the beads to a temperature of about 120° Centigrade, they expanded to form monocellular particles having diameters of about 5 microns to about 15 microns.

EXAMPLE 31

The procedure of example 30 was repeated with the exception that 40 parts of methyl methacrylate and 60 parts of vinyl acetate were utilized. The oil phase was 31.4 volume percent neopentane. The product was generally similar in appearance and behavior on heating to that of example 30.

EXAMPLE 32

The procedure of example 30 was repeated with the exception that 10 parts of methyl methacrylate and 90 parts of vinyl acetate (31.2 volume percent neopentane) were employed in the monomer mixture. The product obtained comprised a plurality of beads which were clear, transparent, and had a diameter ranging from about 8 to 10 microns. Microscopic examination of the beads indicated encapsulation of distinct liquid phase therein and, on heating the beads in the 8 to 12 micron range at a temperature of about 120° Centigrade, they expanded to form monocellular particles having diameters of about 25 microns.

EXAMPLE 33

The procedure of example 1 was repeated with the exception that the monomer mixture employed was a mixture of 90 parts of methyl methacrylate, 10 parts of butyl acrylate, and 0.05 part of divinyl benzene. Twenty-three weight percent based on the weight of the oil phase (31.05 volume percent) of neopentane was employed. The product was obtained in the form of small beads. Microscopic examination of the beads indicated symmetrical encapsulation, and on heating a portion of the beads to a temperature of about 110° Centigrade, the beads expanded to monocellular particles having diameters of from about two to about five times their original diameters.

EXAMPLE 34

The procedure of example 33 was repeated with the exception that 80 parts of methyl methacrylate, 20 parts of butyl acrylate, and 0.05 part of divinyl benzene was employed as the monomer mixture. The oil phase was 31.1 volume percent neopentane. The product obtained was a plurality of fine small beads having an average diameter of about 5 microns. Microscopic examination of the beads did not clearly show the separate neopentane phase. However, on heating a portion of the product to a temperature of about 110° Centigrade, the beads expanded to form monocellular particles having an average diameter of about 15 microns.

EXAMPLE 35

The procedure of example 1 was repeated with the exception that 15 weight percent (21.2 volume percent) of the oil phase of neopentane was employed. The resultant product was a plurality of small beads having diameters of about 5 microns. Microscopic examination of the beads indicated a distinct and separate liquid phase encapsulated therein. The cavity containing the liquid phase was displaced somewhat from the center of the bead. On heating a portion of the product to a temperature of 130° Centigrade, particles were obtained having a shape generally similar to that shown in FIG. 4.

EXAMPLE 36

The procedure of example 1 was repeated with the exception that 30 weight percent (39.55 volume percent) of the oil phase of neopentane was employed. Substantially similar results were obtained.

EXAMPLE 37

The procedure of example 1 was repeated with the exception that the monomer employed was methyl methacrylate along and 15 weight percent (21.1 volume percent) of the oil phase of isopentane. The product was tended in the form of small beads having diameters of from about 5 microns to about 15 microns. Microscopic examination of the beads indicated that the smaller beads, i.e., less than about 10 microns, had encapsulated therein a single body of isopentane, while the larger beads contained from two to four individual cells. In this experiment, the majority of the encapsulated isopentane phase was displaced toward the periphery of the beads. On heating a portion of the beads to a temperature of about 130° Centigrade, they expanded to form a configuration generally similar to that illustrated in FIG. 2. The beads containing multiple occlusions of isopentane tended to form multicellular particles.

EXAMPLE 38

The procedure of example 1 was repeated wherein methyl methacrylate alone was used as the monomer and 20 weight percent, based on the weight of methyl methacrylate, of isopentane were utilized. The isopentane was 27.3 volume percent of the total volume of the oil phase. The product obtained was in the form of small beads having a diameter of from about 2 to about 8 microns. Microscopic examination of the product indicated a liquid phase symmetrically encapsulated within the bead. On heating a portion of the product to a temperature of about 130° Centigrade, they expanded to form monocellular particles having diameters of from about two to five times the original diameter.

EXAMPLE 39

The procedure of example 1 was repeated with the exception that methyl methacrylate alone was used as the monomer and 30 weight percent (39.2 volume percent) of the oil phase of isopentane. Results obtained were substantially similar to those obtained in example 38.

EXAMPLE 40

The procedure of example 1 was repeated utilizing as a monomer mixture 100 parts of methyl methacrylate containing 0.05 part of divinyl benzene. The neopentane was replaced with 34.2 weight percent (25.4 volume percent) of the oil phase of dichlorotetrafluoroethane. The product was a plurality of fine beads which, on microscopic examination, indicated that greater than 90 percent of the beads showed symmetrical encapsulation of the haloethane. A quantity somewhat less than 10 percent of the total number of beads showed nonsymmetrical encapsulation. A portion of the product was heated to a temperature of about 130° Centigrade. The symmetrically formed beads expanded from about three diameters resulting in monocellular particles, whereas the beads showing evidence of asymmetric encapsulation assumed a shape generally similar to that illustrated in FIG. 4.

EXAMPLE 41

The procedure of example 40 was repeated with the exception that 39.4 weight percent (29.9 volume percent) of the oil phase of dichlorotetrafluoroethane was employed. The product was a plurality of fine beads having diameters of from about 2 to about 8 microns which, on heating to a temperature of about 130° Centigrade, expanded to form two to four times their original diameters to form monocellular particles. Microscopic examination of the unexpanded beads indicated symmetric encapsulation of the dichlorotetrafluoroethane.

EXAMPLE 42

The procedure of example 1 was repeated with the exception that the monomer mixture employed comprised styrene containing 0.05 percent divinyl benzene and 30 weight percent (38.8 volume percent) of the oil phase of neopentane. The product obtained consisted of a plurality of small beads having diameters within the range of from 2 to about 10 microns. Microscopic examination of the product indicated unsymmetrical encapsulation. Heating of a portion of the beads to a temperature of 130° Centigrade resulted in small particles having the configuration generally similar to that shown in FIG. 4.

EXAMPLE 43

Repetition of example 42, wherein the divinyl benzene content was 0.12 percent, 0.08 percent, 0.04 percent, and 0.02 percent, gave substantially similar results.

EXAMPLE 44

Repetition of example 42, employing 30 weight percent (37.5 volume percent) of the oil phase of neohexane, gave substantially similar results.

EXAMPLE 45

The procedure of example 42 was repeated with the exception that the neopentane was replaced with 71.5 weight percent (61.4 volume percent) of the oil phase of dichlorotetrafluoroethane. The product was in the form of small beads having a diameter of from about 2 to about 10 microns. Microscopic examination of the beads indicated unsymmetrical encapsulation of a liquid phase within the bead. On heating a portion of the product to a temperature of about 130° Centigrade, particles were obtained having a shape generally similar to FIG. 4.

EXAMPLE 46

Repetition of example 45, with the exception that 57.2 weight percent (47.8 volume percent) of the oil phase of dichlorotetrafluoroethane was employed and 2 percent of benzoyl peroxide was employed as a catalyst based on the monomer, gave results substantially similar to example 42.

EXAMPLE 47

The procedure of example 42 was repeated with the exception that the monomer mixture comprised styrene containing 0.2 percent by weight of ethylene glycol dimethacrylate and 25 weight percent (37.45 volume percent) of the oil phase of neohexane replaced the neopentane. Results obtained were substantially similar to those of example 42.

EXAMPLE 48

The procedure of example 1 was repeated with the exception that the monomer mixture comprised styrene and 25 weight percent (23 volume percent) of the oil phase of neopentane was employed. After polymerization, the product was in the form of fine beads having a diameter of about 5 microns. Microscopic examination of the beads indicated that a major portion showed unsymmetric encapsulation. On heating a portion of the beads to a temperature of about 120° Centigrade, those showing symmetric encapsulation expanded to monocellular particles having a diameter of about 15 microns, while those showing unsymmetric encapsulation acquired the appearance of the particles shown in FIG. 4.

EXAMPLE 49

The procedure of example 1 was repeated with the exception that the monomer mixture comprised 99 parts of styrene and one part of methacrylic acid. About 25 weight percent (23 volume percent) of the oil phase of neopentane was added to the reaction mixture. The product was obtained in the form of a plurality of small beads having a diameter of about 5 microns. Microscopic examination of the beads indicated symmetric encapsulation of the neopentane and showed what appeared to be a tiny gas bubble also present in the cavity. A portion of the product was heated to a temperature of about 130° Centigrade, and the beads expanded about five times their original diameters and were monocellular particles.

EXAMPLE 50

The procedure of example 49 was repeated with the exception that 98 parts of styrene and two parts of methacrylic acid were utilized as the monomer. The neopentane was 23 volume percent of the oil phase. Results commensurate with those in example 49 were obtained.

EXAMPLE 51

The procedure of example 49 was repeated with the exception that the monomer mixture consisted of 96 parts of styrene and four parts of methacrylic acid. The neopentane was 33 volume percent of the oil phase. The product was obtained in the form of small beads and examination indicated that the results were substantially similar to those obtained in examples 49 and 50, with the exception that a very small percentage of the beads showed unsymmetric encapsulation.

EXAMPLE 52

The procedure of example 49 was repeated utilizing 92 parts of styrene and eight parts of methacrylic acid and also with 86 parts of styrene and 16 parts of methacrylic acid. The oil phases were 32 and 33 volume percent neopentane respectively. The product was obtained in the form of fine small beads having a diameter of from about 1 to 10 microns. Microscopic examination indicated that the encapsulation was asymmetric. On heating, the particles assumed the shape generally shown in FIG. 4.

EXAMPLE 53

The procedure of example 1 was repeated with the exception that the monomer mixture comprised 98 parts of styrene, two parts of methacrylic acid, and 0.04 percent divinyl benzene, based on the combined weight of styrene and methacrylic acid. Thirty-one weight percent (39.2 volume percent) of the oil phase of neopentane was used. The product obtained was in the form of small beads having a diameter from about 2 to about 10 microns. Microscopic examination of the beads indicated symmetrical configuration of a liquid phase within. On heating a portion of product to about 130° Centigrade, the beads expanded from about two to five times their original diameters forming monocellular particles.

EXAMPLE 54

The procedure of example 1 was repeated with the exception that the monomer mixture comprised 83 parts of styrene, two parts of methacrylic acid, 15 parts of vinylbenzyl chloride and 0.025 percent divinyl benzene, based on the combined weight of the styrene and methacrylic acid. Thirty weight percent (39.44 volume percent) of neopentane, based on the weight of the oil phase, was utilized. The product was obtained in the form of fine beads having a diameter of about 8 microns. Microscopic examination of the beads indicated that, although spherical in form, they did not have a transparent surface. On heating a portion of the product to a temperature of about 140° Centigrade, the beads expanded several diameters to form monocellular particles.

EXAMPLE 55

The procedure of example 1 was repeated with the exception that the monomer mixture comprised 99 parts of styrene and one part of acrylic acid. Neopentane was incorporated within the reaction mixture in an amount equal to 30 weight percent (38.8 volume percent) of the weight of the oil phase. The product obtained was a plurality of small beads having a diameter of from about 2 to about 10 microns and which, on microscopic examination, indicated symmetrical encapsulation. On heating the beads to a temperature of 130° Centigrade, they expanded about two to four times their original diameters and formed monocellular particles.

EXAMPLE 56

The procedure of example 55 was repeated utilizing 96 parts of styrene and four parts of acrylic acid. The results obtained were substantially identical to those in example 55. The neopentane was 38.8 volume percent of the oil phase.

EXAMPLE 57

The procedure of example 1 was repeated with the exception that the monomer mixture comprised 98 parts of styrene and two parts of acrylic acid and 0.12 percent of ethylene glycol dimethacrylate, based on the combined weight of the styrene and acrylic acid. 26.9 percent by weight (34.05 percent by volume), based on the weight of the oil phase, of neopentane was charged to the reactor. The product was obtained in the form of small beads having a diameter of from about 2 to about 10 microns. A portion of the beads was heated to a temperature of about 130° Centigrade and expanded to form monocellular particles having from about two to about five times their original diameters. Microscopic examination of the unexpanded particles indicated unsymmetrical encapsulation of the liquid phase therein.

EXAMPLE 58

The procedure of example 57 was repeated with the exception that 0.12 percent divinyl benzene was incorporated in the monomer mixture instead of ethylene glycol dimethacrylate. Similar results were obtained.

EXAMPLE 59

The procedure of example 1 was repeated with the exception that the monomer mixture comprised 98 parts of styrene and two parts of methacrylic acid and 0.05 parts of divinyl benzene. The reactor was charged with 47.6 percent (36.6 volume percent) based on the weight of the oil phase of dichlorotetrafluoroethane. The product was obtained in the form of a plurality of small beads having a diameter of from about two to about 10 microns. Microscopic examination of the beads indicated symmetrical encapsulation of the liquid phase therein. A portion of the beads was heated to a temperature of about 130° Centigrade and they expanded to form monocellular particles having from about two to about five times their original diameters.

EXAMPLE 60

The procedure of example 1 was repeated with the exception that the monomer mixture comprised 91 parts of vinylidene chloride and nine parts of acrylonitrile. The blowing agent used was 23 weight percent (36.6 volume percent) of the oil phase of neopentane. Examination of the resultant beads indicated that their diameters were from 1 to 10 microns. A portion of the beads was heated to a temperature of about 140° Centigrade and they expanded to form monocellular particles having from about two to five times their original diameters.

EXAMPLE 61

In a manner similar to example 60, a monomer mixture comprising 92 parts vinylidene chloride and eight parts of acrylonitrile was copolymerized in the presence of 23 percent by weight (36.7 volume percent) of the oil phase. Substantially similar results were obtained.

EXAMPLE 62

The procedure of example 60 was repeated with the exception that the monomer mixture employed utilized 93 parts of vinylidene chloride and seven parts of acrylonitrile, together with 23 weight percent neopentane based on the weight of the oil phase (36.8 volume percent). Results substantially commensurate with those of example 60 were obtained. By way of contrast, when a monomer mixture containing 94 percent vinylidene chloride and 6 percent of acrylonitrile, beads were obtained which generally resembled coffee beans in form, and no foaming was obtained.

EXAMPLE 63

The procedure of example 1 was repeated with the exception that the monomer mixture employed was 70 percent vinyl acetate and 30 percent methyl methacrylate by weight and 23 weight percent (31.2 volume percent) of the oil phase of neopentane was used as a blowing agent. The polymerization product was fine spherical beads having diameters of from about 1-10 microns and on microscopic examination there was symmetrically encapsulated a distinct liquid phase of neopentane. A portion of the beads was heated to a temperature of about 140° Centigrade and they expanded to form monocellular particles having diameters of from about two to five times their original diameter.

EXAMPLE 64

The procedure of example 63 was repeated with the exception that the initial monomer mixture comprised 80 parts of vinyl acetate and 20 parts of methyl methacrylate. The neopentane was 31.2 volume percent of the oil phase. The results obtained were substantially identical to those of example 63.

EXAMPLE 65

The procedure of example 63 was repeated with the exception that 90 parts of vinyl acetate and 10 parts of methyl methacrylate were employed in the monomer mixture. The blowing agent was 31.2 volume percent of the oil phase. The results obtained were substantially identical with those obtained in example 63.

EXAMPLE 66

The procedure of example 63 was repeated with the exception that the monomer was vinyl acetate. The neopentane was 31.2 volume percent of the oil phase. Results obtained were substantially identical with those obtained in example 63.

EXAMPLE 67

The procedure of example 1 was repeated with the exception that the monomer mixture employed comprised 98 parts of methyl methacrylate and two parts of acrylic acid. Isobutylene was employed as a blowing agent at a level of 20.7 percent by weight (26.8 percent, by volume) of the oil phase. Microscopic examination of the particles indicated that they had diameters ranging from about 1 micron to about 10 microns and on heating a portion of the beads to a temperature of about 140° Centigrade, beads were obtained which were monocells and had diameters of from about two to five times the diameters of the unfoamed beads. Similar results were obtained when the concentration of isobutylene was increased to 24.7 percent by weight.

EXAMPLE 68

The procedure of example 67 was repeated using n-butane at concentrations of 20.7 and 24.7 weight percent, (28.9 and 33.85 volume percent) of the oil phase, isobutane and neopentane at the same concentrations, and results were obtained which were substantially similar to those obtained in example 67.

EXAMPLE 69

The procedure of example 1 was repeated with the exception that the monomer mixture comprised styrene with 2 percent by weight methacrylic acid and 0.05 percent by weight of divinyl benzene. The blowing agent used was 1,1-dichlorotetrafluoroethylene and was present at a concentration of 47.6 percent (38 volume percent) of the oil phase. Microscopic examination of the resultant beads indicated that they had a diameter of about 1-10 microns. On heating to a temperature of about 130° Centigrade, they expanded to monocellular particles having from about two to five times their original diameters. Symmetrical encapsulation of the blowing agent was obtained.

EXAMPLE 70

The procedure of example 1 was followed utilizing a monomer mixture comprising styrene with 2 percent by weight methacrylic acid, 0.05 percent divinyl benzene, and the blowing agent utilized was 25 weight percent neopentane (33 percent by volume) of the oil phase. After polymerization, spherical beads were obtained which had diameters of from about 1 to about 10 microns. Microscopic examination of these particles indicated symmetrical encapsulation of a distinct liquid neopentane phase. On heating to a temperature of about 135° Centigrade, the majority of the beads expanded to monocellular particles having from about two to five times their original diameter.

EXAMPLE 71

The procedure of example 70 was repeated with the exception that only 1 percent of methacrylic acid was utilized. The neopentane was 33 volume percent of the oil phase. Substantially similar results were obtained.

EXAMPLE 72

The procedure of example 70 was repeated with the exception that 0.8 percent methacrylic acid was employed. The neopentane was 33 volume percent of the oil phase. The beads obtained were from 1-10 microns in diameter. Microscopic examination indicated that about 60 percent of the beads shown symmetrical encapsulation while the remaining 40 percent showed an asymmetric encapsulation. On heating to 140° Centigrade, expanded monocellular particles were obtained from the beads showing symmetric encapsulation while the product of the asymmetric beads were particles such as those of FIG. 4.

EXAMPLE 73

The procedure of example 70 was repeated with the exception that 0.4 percent methacrylic acid was utilized. The neopentane was 33 volume percent of the oil phase. The resultant product comprised small beads having diameters of from about 1–10 microns. Microscopic examination of the beads indicated that about 80 percent of the beads had asymmetric encapsulation and that about 20 percent of the beads showed a symmetrically encapsulated liquid center of neopentane. On heating the beads to a temperature of about 140° Centigrade, those showing symmetric encapsulation expanded to form monocellular particles of about two to five times their original diameters, whereas the beads showing asymmetric encapsulation formed particles such as those of FIG. 4. When the foregoing procedure was repeated without the inclusion of the methacrylic acid and 95 percent of the beads showed asymmetric encapsulation while substantially less than 5 percent showed symmetric encapsulation, similar results were obtained when heated to 140° Centigrade.

EXAMPLE 74

The procedure of example 1 was repeated with the exception that the monomer was styrene and 2 percent by weight acrylic acid and 0.05 percent by weight divinyl benzene. Neopentane was used as the blowing agent at a concentration of 25 weight percent based on the oil phase (33 volume percent). A product was obtained in the form of spherical beads having a diameter of from about 1–10 microns. About 90 percent of the beads were observed to show symmetrical encapsulation and, when heated to a temperature of about 140° Centigrade, formed monocellular particles having about three to five times their original diameter.

Example 75

The procedure of Example 74 was repeated with the exception that the concentration of acrylic acid was reduced to about 1.6 percent. The neopentane was 33 volume percent of the oil phase. About 80 percent of the resultant beads showed symmetrical encapsulation and foamed to monocellular particles.

EXAMPLE 76

The procedure of example 74 was repeated with the exception that 1 percent acrylic acid was employed. The neopentane was 33 volume percent of the oil phase. About 20 percent of the resultant beads showed symmetrical encapsulation of the neopentane and about 80 percent of the beads showed asymmetric encapsulation. On orthochlorostyrene, to 140° Centigrade, the beads showing symmetric encapsulation expanded to monocellular particles, whereas the asymmetric beads formed particles generally similar to that of FIG. 4. When the concentration of the acrylic acid was reduced to 0.4 percent the proportion of beads showing symmetrical encapsulation was reduced to around 5 percent.

EXAMPLE 77

The procedure of example 1 was repeated with the exception that the monomer mixture comprising 92 parts of orthochlorostyrene, eight parts of methacrylic acid, and 0.05 part of divinyl benzene was used. The blowing agent was neopentane and utilized in the proportion of 25 percent by weight (37.8 volume percent) of the oil phase. The polymerization product comprised small spherical beads having diameters of from about 1–10 microns which, on microscopic examination, indicated a symmetrically disposed liquid inclusion of neopentane. When heating to a temperature of 140° Centigrade, the particles became monocells and increased in diameter by a factor of from about two to about five. Similar results were obtained when six, four and two parts of acrylic acid were employed in the place of eight parts of acrylic acid. When 10 parts of acrylic acid were used, only asymmetric encapsulation was obtained.

EXAMPLE 78

The procedure of example 77 was repeated with the exception that one part of acrylic acid was employed. The neopentane was about 38 volume percent of the oil phase. The resultant beads had a diameter of from about 1–10 microns and of those beads about 80 percent showed asymmetric encapsulation. The remaining beads showed symmetrical encapsulation and on heating to about 150° Centigrade, expanded from about two to about five times the original diameter forming monocellular particles.

EXAMPLE 79

The procedure of example 1 was repeated with the exception that the monomer employed was styrene. The blowing agent was 25 percent by weight (33 percent by volume) based on the oil phase of neopentane. The product comprised small spheres 33 diameters of from about 1 to about 10 microns. Over 99 percent of the spheres showed asymmetric encapsulation while a small fraction of the product showed symmetrical encapsulation. On heating, the particles showing symmetrical encapsulation expanded to form monocellular beads whereas those showing asymmetric encapsulation formed a particle generally as shown in FIG. 4.

EXAMPLE 80

The procedure of example 1 was repeated with the exception that the monomer mixture comprised 98 percent styrene and 2 percent acrylonitrile. The blowing agent utilized was neopentane at a concentration of 25 percent by weight (33 volume percent) based on the oil phase. The resultant product was in the form of small beads about 1–10 microns in diameter. On heating to a temperature of about 150° Centigrade, about 80 percent of the beads expanded to form monocellular particles having from about two to five times their original diameter. Generally, the beads showing asymmetric encapsulation on heating formed particles generally as shown in FIG. 4.

EXAMPLE 81

Repetition of example 80, utilizing successively 4, 6, and 8 percent of acrylonitrile in the monomer mixture, gave generally similar results with the proportion of asymmetric encapsulation decreasing as the acrylonitrile concentration was raised. The neopentane was 38 percent by volume of the oil phase.

EXAMPLE 82

Repetition of example 81 utilizing as separate monomer mixtures of 90 parts of styrene and 10 of acrylonitrile, 80 parts of styrene and 20 parts of acrylonitrile, 70 parts of Styrene and 30 parts of acrylonitrile, 60 parts of styrene and 40 parts of acrylonitrile, 50 parts of styrene and 50 parts of acrylonitrile, 40 parts of styrene and 60 parts of acrylonitrile, 30 parts of styrene and 70 parts of acrylonitrile, and 20 parts of styrene and 80 parts of acrylonitrile. All provided particles having diameters of from about 1 micron to about 10 microns which on microscopic examination, showed symmetric encapsulation of the neopentane blowing agent. Heating these materials to a temperature of about 150° Centigrade resulted in expansion of the particles to form monocellular particles having from about two to five times their original diameters.

EXAMPLE 83

THe procedure of example 80 was repeated with the exception that the monomer mixture utilized comprised 60 parts of styrene, 40 parts of acrylonitrile, neopentane was added to four separate polymerizations at concentrations of 20, 15, 10 and 5 percent by weight of the oil phase, respectively. The corresponding volume percentages are 25.9, 20, 12.8 and 6.8. The polymerization utilizing 20 and 15 percent neopentane gave symmetrically encapsulated beads which expanded readily on heating to form monocellular particles, whereas the polymerization containing 10 percent neopentane showed some asymmetric encapsulation and some particles showing no encapsulation. When only 5 percent by weight of the neopentane was utilized, no encapsulation was observed and no foaming was observed.

EXAMPLE 84

The procedure of example 1 was followed with the exception that the monomer employed comprised 30.6 parts of vinyl chloride and 45.6 parts of vinylidene chloride, and the blowing agent was 18.6 parts of neopentane (30.4 volume percent based on the oil phase) and only minimum shaking was employed to disperse or emulsify the particles. The resultant product was a dispersion of small particles in the aqueous phase. These were separated by filtration. Microscopic examination of the resultant beads indicated that they had diameters ranging from 15 to about 50 microns and there was encapsulated within each of the beads a centrally disposed spherical body of neopentane. On heating a portion of the beads to 140° Centigrade, they were observed to expand to monocellular particles and the surface thereof to show a fine pattern somewhat resembling crazing.

EXAMPLE 85

Utilizing the polymerization procedure of example 1, a plurality of samples were prepared containing 100 percent methyl methacrylate, 90 percent methyl methacrylate, 80 percent methyl methacrylate, 70 percent methyl methacrylate, 60 percent methyl methacrylate, 50 percent methyl methacrylate, 40 percent methyl methacrylate, 30 percent methyl methacrylate, 20 percent methyl methacrylate, and 10 percent methyl methacrylate. The remainder of the monomer charge was monomeric vinylidene chloride. The blowing agent used was 25 weight percent neopentane based on the oil phase. The volume percentage of neopentane varied from 34 percent for the 100 percent methyl methacrylate mixture to 39.5 percent for the 10 percent methyl methacrylate sample. Under microscopic examination, the particles showed symmetrical encapsulation of the liquid neopentane. In all cases, particles having diameters of about 10 microns were obtained, some as low as 3 microns and others as large as about 20. On heating the particles to a temperature of about 130° Centigrade, all showed significant expansion with the exception of the sample containing 90 percent vinylidene chloride by weight.

EXAMPLE 86

In a manner similar to example 1, particles were prepared utilizing methyl acrylate as the monomer with the exception that in one case 50 weight percent (59.5 volume percent) based on the oil phase of neohexane was utilized as the blowing agent and in another sample 25 weight percent (32.9 volume percent) based on the oil phase. On polymerization, beads having an average diameter of about 10 microns were formed and in each case on heating to about 110° Centigrade monocells were obtained. The particles expanded about five to six times their initial diameter. Microscopic examination of the unexpanded beads indicated symmetrical encapsulation was obtained in each sample.

EXAMPLE 87

In a manner similar to example 1, three samples were prepared using 25 percent by weight (31 to 33.8 volume percent) based on the oil phase of isopentane as the blowing agent and monomer mixtures comprising 90 parts by weight methyl acrylate and 10 parts by weight methyl methacrylate, 80 parts by weight methyl acrylate and 20 parts by weight methyl methacrylate, and 70 parts by weight methyl acrylate with 30 parts by weight methyl methacrylate. The resultant beads were spherical and under microscopic examination showed symmetrical encapsulation of a liquid center therein. On heating to a temperature of about 120° Centigrade, the particles expanded to about five times their original diameter.

EXAMPLE 88

In a manner similar to example 1, a plurality of samples was prepared utilizing as the monomer the following parts by weight of monomer: methyl acrylate to methyl methacrylate, 100:0, 90:10, 80:20 and 70:30. The blowing agent utilized was 25 weight percent (33 volume percent) of the neohexane based on the oil phase. Microscopic examination of the resultant product indicated symmetrical encapsulation of the neohexane within the particle and on heating to a temperature of 134° Centigrade the particles expanded from about two to three times their original diameter.

EXAMPLE 89

Utilizing the polymerization procedure of example 1, samples were prepared using 70 parts by weight methyl acrylate and 30 parts by weight methyl methacrylate and 25 percent by weight (33.9 percent by volume) of the oil phase of neopentane in one sample and 25 percent by weight (33.6 percent by volume) of the oil phase of isopentane in a second sample. These materials are polymerized to form beads having a diameter of about 10 microns. On microscopic examination, these beads were found to have a liquid phase symmetrically encapsulated therein. On heating to a temperature of about 120° Centigrade, the particles expanded to form a plastic foam.

EXAMPLE 90

In a manner similar to example 1, a plurality of samples was prepared utilizing a monomer mixture of 90 parts by weight of methyl methacrylate, 10 parts by weight of ethylene glycol dimethacrylate, neopentane was employed as the blowing agent utilizing 50, 60, 70, 80, 90 and 95 percent by weight (60 to 96.5 volume percent) of the neopentane based on the oil phase. The polymerization resulted in beads having a diameter of about 10 microns. Microscopic examination indicated that the neopentane was symmetrically encapsulated therein. On heating to a temperature of about 120° Centigrade, the particles doubled in diameter. Analysis of the resultant beads after drying indicated that their neopentane content was about 10 percent less than the proportion of neopentane in the original charge.

EXAMPLE 91

Polymer beads were prepared utilizing the procedure set forth in example 1 with the exception that two separate experiments were carried out utilizing a monomer mixture of 80 parts by weight of vinylidene chloride and 20 parts by weight of butyl acrylate. The second monomer mixture contained 80 parts by weight of vinylidene chloride and 15 parts by weight of butyl acrylate and 5 parts by weight of acrylonitrile. The blowing agent employed was neopentane in a quantity which was 20 percent by weight of the oil phase and about 32 volume percent. The product of the polymerization was beads having a diameter of about 10 microns and under microscopic examination showed symmetrical encapsulation of neopentane within the bead. Heating of the beads to a temperature of 125°

Centigrade resulted in expanded monocells having diameters of from about two to three times the original diameter of the unexpanded bead.

EXAMPLE 92

A plurality of polymerization experiments were carried out utilizing the procedure of example 1 with the exception that 25 percent by weight (30.8 to 33.9 volume percent) of neopentane was employed as the blowing agent and the following mixtures were employed in the various samples.

TABLE

| Methyl Acrylate | Acrylonitrile |
|---|---|
| 10 | 90 |
| 20 | 80 |
| 30 | 70 |
| 40 | 60 |
| 50 | 50 |
| 60 | 40 |
| 70 | 30 |
| 80 | 20 |
| 90 | 10 |

The figures in the table indicate the proportion of each monomer by weight. On completion of the polymerization, the product of each of the samples was in the form of small beads ranging from about 5–18 microns in diameter. Microscopic examination of these particles indicated symmetrical encapsulation of the neopentane in the beads, heating of the beads to a temperature of about 130° Centigrade caused them to expand to about three times their original diameter with the exception of the products of the samples containing 80 and 90 parts by weight of acrylonitrile, where only a portion of the beads expanded and then only to a lesser degree than the other samples.

EXAMPLE 93

Beads prepared in accordance with example 1 were confined within a mold in a quantity sufficient to fill the mold when expanded. They were heated to a temperature of about 140° Centigrade for a period of 3 minutes. The mold and contents were cooled and the resultant article was found to conform to the smooth configuration of the mold. It had a white appearance and the tiny cells were not readily detectable by means of the naked eye. It was strong, durable and apparently had a smooth surface. On microscopic examination, the individual particles appeared to be tightly bonded together, each forming an individual cell.

EXAMPLE 94

Expanded polymethyl methacrylate particles prepared in accordance with example 1 and having diameters of about 2–3 microns and a void to polymer ratio of approximately 20:1, i.e., a bulk density of approximately 0.06, were admixed with water in a ratio of 15 parts by weight of particles to 85 parts of water. Fifty-eight parts of the resultant dispersion were admixed with 28.6 parts of a synthetic resinuous latex prepared from 67 parts by weight of ethyl acrylate and 33 parts by weight of methyl methacrylate. This latex was 50 percent solids. 13.5 parts of a 2 percent by weight hydroxypropylmethyl cellulose solution was added to the latex expanded particle dispersion. The methyl cellulose served as a viscosity controlling agent to permit brushing. The resultant material was then brushed onto a half-inch diameter copper tube and permitted to air dry. This procedure was repeated resulting in a coating about 8 mils in thickness. A portion of the half-inch copper tube was coated with the latex alone until a coating thickness of 8 mils was obtained (dry thickness). Water at a temperature of about 1° to 2° Centigrade was then pumped through the tube while the tubing was maintained in a room having a temperature of about 22° Centigrade. The surface temperatures of the coated and uncoated tubing were measured by means of a surface pyrometer. The bare copper surface temperature at the inlet and outlet of the tube measured 4½° and 5½° Centigrade, respectively. The latex coating measured about 9° Centigrade whereas the surface of the coating containing the expanded particles measured 18½° Centigrade.

EXAMPLE 95

A portion of the coating composition of example 93 employing the expanded particles was applied to bond paper and permitted to air dry at about 24° Centigrade to result in a coating about 5 mils in thickness. The resultant coating almost totally obscured printing on the bond paper, adhered well to the paper, and provided an insulating coating thereon.

EXAMPLE 96

A coating composition was prepared utilizing unexpanded dry particles as prepared in example 1, wherein 50 parts by weight of the particles were admixed with 122 parts of an aqueous latex, 41 percent solids which was prepared by utilizing 50 percent by weight methyl methacrylate, 46 percent by weight normal butyl acrylate and 4 percent by weight acrylic acid. Two coatings of this formulation were applied to the outer wall of a paper cup with air drying between the coats and after the last coat. On heating the cup to a temperature of 130° Centigrade, a white opaque foam coating was obtained which provided adequate insulation for hot beverages such as coffee. No tendency was observed for the coating to peel or otherwise be removed from the container.

EXAMPLE 97

In a manner similar to the foregoing example, utilizing the 70:30 copolymer of example 89, a thin plastic cup made from a graft copolymer of 95 percent styrene on polybutadiene rubber was similarly coated and subsequently expanded at 70° Centigrade to provide commensurate beneficial results.

EXAMPLE 98

The coating composition of example 94 was brushed over the entire outside surface of a paper cup and the inside of an identical paper cup until a coating thickness of about 5 mils was obtained on each cup. The cups were then nested with the coated surfaces adjacent and facing each other. The nested cups were placed in an air oven at 140° Centigrade. The coating expanded, and fused together forming a rigid unitary article. The resultant laminated cup was strong and rigid. Similar beneficial results were obtained when sheets of paper were treated in a similar manner and the coatings foamed in contact with each other.

EXAMPLE 99

The procedure of example 97 was repeated wherein the various binders were employed including a latex about 45 percent solids prepared by polymerizing 40 percent styrene and 60 percent 2-ethylhexyl acrylate, a latex about 40 percent solids prepared by polymerizing 15 parts of styrene, 55 parts isobutyl acrylate, and 30 parts of acrylic acid, a latex prepared by polymerizing 60 parts of styrene, 40 parts of butadiene and a latex comprising 67 parts of styrene and 33 parts of butadiene.

EXAMPLE 100

A coating composition was prepared using 166 parts by weight of a suspension of the expandable particles prepared in example 1 wherein the solids concentration was 30 percent by weight, 120 parts by weight of a latex, 41.7 percent solids and prepared by the copolymerization of 40 parts of styrene and 60 parts of 2-ethylhexyl acrylate, and 15 parts by weight of a 5 percent by weight solution of a sodium polyacrylate commercially available under the trade designation of "Acrysol GS."

This coating formulation was applied to a wooden panel which had been previously coated with two coats of a blue colored lacquer. This coating adhered well to the surface, showed no tendency to crack or peel therefrom, but on heating with a blast of hot air the particles in the coating expanded, and the coating released from the surface leaving the clean surface of the blue lacquer. In a similar manner, metal panels were coated with the above-mentioned composition and dried to provide a continuous protective film. On heating of the coatings they released form the surface to leave a clean metal surface.

EXAMPLE 101

A mixture was prepare utilizing 200 parts of a 55 percent solids natural rubber latex, 50 parts by weight of dry unexpanded particles prepared in accordance with example 1, two parts of a rubber antioxidant sold under the designation of "Wingstay S" and 50 parts by weight of water. These components were mixed to a uniform dispersion and coagulated by the addition of hydrochloric acid while agitating. When this dispersion was completely coagulated, the coagulum was separated and vacuum dried at about 23° Centigrade for 48 hours. A rectangular portion was cut from the dried mass having the relative dimensions of one, two and four and placed in an air oven at a temperature of 165° Centigrade for 5 minutes. An enlarged replica of the original piece was formed which had a density of 18.3 pounds per cubic foot. It was observed that the expanded material was stiffer than prior to expansion while still retaining elastomeric characteristics. The compressive strength of the expanded material was significantly higher than most sponge rubbers. Microscopic examination of the sections of the body indicated that the expandable particles maintained their indentity. Other samples of the above-delineated composition were foamed by means of dielectric heat to densities of about 14 pounds per cubic foot. The unexpanded portions varied in thickness from about one-fourth of an inch to 1 inch.

EXAMPLE 102

One hundred parts by weight of an epoxy resin composition was prepared utilizing a mixture of a condensation product of Bisphenol A and epichlorohydrin under the designation of D.E.R. 331, three parts by weight of water, 12 parts by weight of triethylenediamine and 16 parts by weight of dry particles prepared in accordance with example 1. Mixing of the above components resulted in a foamable material that expanded to a rigid foam having a density of about 2 pounds per cubic foot. An alternate method of formulating the expandable epoxy composition is to employ a minor portion of the triethylenetetraamine such as two parts by weight of the triethylenetetraamine, a partial prepolymer is formed having a significantly increased viscosity. Subsequent addition of the remaining 10 parts of the triethylenetetraamine causes the generation of sufficient heat to expand the particles and provide a rigid epoxy foam.

EXAMPLE 103

A polymerization reactor equipped with an agitator was charged with 100 parts of deionized water and 60 parts of a 30 weight percent dispersion of colloidal silica in water. The colloidal silica dispersion was 30 percent by weight solids and is available under the trade name of "Ludox HS." To this mixture was added 10 parts of a 10 weight percent aqueous solution of a copolymer prepared from diethanol amine and adipic acid in equimolar proportions by carrying out a condensation reaction to give a product having a viscosity of about 100 centipoises at 25° Centigrade. One part of a solution containing 2.5 weight percent potassium dichromate was added. The pH of the solution was adjusted to four by means of hydrochloric acid. An oil phase mixture was prepared by utilizing 40 parts of neopentane and 60 parts of methyl methacrylate and one-half percent by weight of benzoyl peroxide based on the weight of the methyl methacrylate. The oil phase mixture was added to the water phase with violent agitation supplied by a blade rotating at a speed of about 10,000 r.p.m. The reactor was immediately sealed and a portion sampled to determine the particle size. The droplets appeared to have diameters of from about one-half to about 3 microns. After the initial dispersion, the reaction mixture was maintained at a temperature of about 80° Centigrade for a period of about 24 hours. At the end of this period, the temperature was lowered and the reaction mixture had the appearance of a white milky liquid similar to a chalk-white milk. A portion of the mixture was filtered to remove the beads and the beads subsequently dried in an air oven at a temperature of about 30° Centigrade. The resultant beads had diameters of from about one-half to 3 microns and showed symmetrical encapsulation. On heating to about 130° Centigrade, the beads expanded to about two to five times their original diameter. A portion of the reaction product was treated in a manner similar to example 100 and commensurate beneficial results were achieved. However, the smaller particles tend to give a smoother, thinner coating which foams in a more uniform manner.

In a manner similar to the foregoing examples, a wide variety of thermoplastic resinous particles having symmetrical and asymmetrical encapsulation are readily prepared by the hereinbefore described methods.

Generally, if symmetrical encapsulation is desired, monomer-blowing agent mixtures are utilized in proportions such that polymer tends to precipitate as the polymerization of the monomer advances to about 10 percent conversion. Generally, polymers which are more soluble in the monomer-blowing agent mixture either provide minor encapsulation or asymmetric encapsulation. Where there is total solubility of the polymer in the blowing agent, no encapsulation results and only a clear bead is obtained. With particles below about 50 microns, such clear beads with no encapsulation show no tendency to foam, expand, or form the cuplike particles shown in FIG. 4. Thus, a particular polymer-blowing agent composition which provides satisfactory foam when utilized in larger sections is oftentimes of no value as a blowing agent when employed with particles smaller than about 50 microns in diameter. The present invention provides a particularly advantageous and beneficial means of preparing expandable thermoplastic, resinous particles having a relatively small size. Beneficially, for many applications requiring smaller particles, diameters of from about 3 to about 50 microns are employed and advantageously particles having diameters of about 5 to about 20 microns provide additional benefits.

The symmetrically encapsulated particles in accordance with the present invention readily expanded to form monocellular particles and are readily employed to mold and form thermoplastic, expanded cellular-shaped articles composed of a multitude of such particles, in a manner generally similar to that utilized for conventional expandable thermoplastic resinous material having a larger particle size.

Expanded beads in accordance with the present invention are particularly advantageous for the preparation of aerosols or plastic smoke. The beads or particles which on expansion have a diameter below 50 microns and most beneficially from about 2 to 25 microns wherein the particles have an individual apparent density of about 0.025. Such small particles are readily dispersed into a stream of gas, typically air, to provide a dispersion or aerosol which does not settle out rapidly. Such aerosols are readily prepared by adding unexpanded particles to a heated gas stream at a rate sufficient to raise the temperature of the unexpanded particles to an expansion temperature or alternately by dispersing preexpanded individual particles in a gas stream by conventional methods. Generally when the particles are to be used for aerosols, it is preferable that a relatively large amount of blowing agent be encapsulated therein. Particularly beneficial are the blowing agent contents in a range of from about 30 to about 50 percent by weight of the particle.

As is apparent from the foregoing specification, the method and manufacture of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method of preparing a hollow monocellular particle comprising providing a thermoplastic expandable synthetic resinous polymeric particle having a generally spherical shape and having encapsulated therein generally concentrically as a generally spherical occlusion, a distinct and separate liquid phase consisting essentially of a volatile organic liquid raising agent, the liquid becoming gaseous at a temperature below the thermoplastic temperature of the particle, the particle being generally impermeable to the raising agent, heating the particle to a temperature sufficient to cause heat plasticization of the polymer shell and volatilization of the raising agent thereby expanding the particle to form a monocellular hollow generally spherical shell having a gaseous center, and cooling the particle to a temperature below the thermoplastic temperature thereof thereby providing a hollow, gas-filled monocellular expanded particle having a diameter substantially larger than the expandable particle.

2. The method of claim 1 wherein a plurality of such particles are expanded in a heated gas.

3. A method of preparing a cellular article comprising providing a mixture of a liquid synthetic thermoplastic film-forming resin dispersion and a plurality of expandable thermoplastic synthetic resinous particles, the thermoplastic resinous particles having encapsulated therein a volatile organic liquid-raising agent as a distinct and separate liquid phase, wherein the liquid raising agent is symmetrically encapsulated within the resinous particles and on heating to a temperature sufficient to cause heat plastification of the particles and the film-forming resin, the particles expand to define monocellular gas-filled cells, the liquid-raising agent becoming gaseous at a temperature below the thermoplastic temperature of the particles, the film-forming resin becoming heat plastified at a temperature below the thermoplastic temperature of the particles, the particles being generally impervious to the liquid-raising agent and impervious to the liquid of the dispersion, applying the mixture to at least a first substrate, removing dispersing liquid from the mixture whereby the film-forming synthetic resinous thermoplastic material adheres the particles together agent to the substrate to form a unitary article, subsequently heating at least a portion of the article to a temperature sufficient to cause the liquid-raising agent to become gaseous and thereby form a plurality of gas-filled cells in the article.

4. The method of claim 3 wherein the cellular article is formed as a coating on the substrate 5. The method of claim 3 wherein the film-forming resin has lower permeability to the blowing agent than the thermoplastic resinous particle.

6. The method of claim 5 wherein the substrate is paper.

7. The method of claim 3 including the step of providing a second substrate oppositely disposed to the first substrate and adhered to the unitary article.

8. The method of claim 3 wherein the film-forming resin is a water-soluble resin.

9. The method of claim 3 wherein the dispersion of thermoplastic film-forming resin is an aqueous dispersion.

10. The method of claim 3 wherein the liquid raising agent has fire-retardant properties.

11. The method of claim 3 wherein the article formed on heating comprises a mass of generally noncoherent particles.

12. The method of claim 3 wherein the film-forming resin is an epoxy resin.

13. The method of claim 3 wherein the unitary article is transparent and the substrate is colored.

14. A thermoplastic expandable synthetic resinous polymeric particle having a generally spherical shape and having encapsulated generally concentrically therein a single generally spherical occlusion as a distinct and separate liquid phase, the occlusion consisting essentially of a volatile organic liquid raising agent, the liquid becoming gaseous at a temperature below the softening point of the particle, the particle being generally impermeable to the liquid raising agent.

15. A thermoplastic synthetic resinous polymeric expandable particle having a generally spherical shape and having encapsulated therein as a distinct and separate phase, an occlusion consisting essentially of a volatile organic liquid raising agent, the liquid becoming gaseous at a temperature below the softening point of the polymer, the raising agent being present in an amount not less than 20 percent by volume based on the total volume of the polymer and the liquid raising agent and the particle being generally impermeable to the liquid raising agent.

16. The particle of claim 15 having the raising agent present in an amount ranging from 50 to 95 percent by volume.

17. A particle in accordance with claim 15 wherein the polymer comprises a polymer of methyl methacrylate.

18. A particle in accordance with claim 15 having a diameter of from about 3 to about 50 microns.

19. The particle of claim 18 wherein the diameter of the particle is between 5 and 20 microns.

20. The particle of claim 15 wherein the thermoplastic resinous material comprises a copolymer of methyl methacrylate with up to about 50 percent by weight of ethyl methacrylate.

21. The particle of claim 15 wherein the thermoplastic resinous material comprises a polymer of methyl methacrylate containing up to about 70 weight percent of o-chlorostyrene.

22. The particle of claim 15 wherein the thermoplastic resinous material comprises a methyl methacrylate polymer containing up to about 50 percent by weight of acrylonitrile.

23. The particle of claim 15 wherein the thermoplastic resinous material comprises a methyl methacrylate polymer containing up to 20 percent p-tertiarybutyl styrene.

24. The particle of claim 15 wherein the thermoplastic resinous material is a polymer of methyl methacrylate containing up to about 40 percent vinyl acetate.

25. The particle of claim 15 wherein the thermoplastic resinous material comprises a polymer of methyl methacrylate containing up to about 20 percent butyl acrylate.

26. The thermoplastic resinous particle of claim 15 having symmetrically encapsulated therein up to about 50 volume percent of the volatile raising agent, said thermoplastic resinous material comprising a polymer of styrene with about 1 to 4 percent by weight of methacrylic acid, based on the weight of the styrene.

27. The particle of claim 15 wherein the thermoplastic resinous material comprises a copolymer of styrene containing from about 10 to 80 percent acrylonitrile, based on the total weight of the monomers.

28. The particle in accordance with claim 15 wherein the thermoplastic resinous material is a copolymer of styrene with from about 15 to 40 percent by weight, based on the total weight of the monomers, of vinylbenzyl chloride.

29. The particle in accordance with claim 15 wherein the thermoplastic resinous material comprises a copolymer of from about 99 to 92 parts of styrene and from about one to eight parts of acrylic acid.

30. The particle of claim 15 wherein the thermoplastic resinous material comprises a polymer of styrene and from about 2 to 10 percent acrylonitrile.

31. The particle of claim 15 wherein the thermoplastic resinous material comprises a polymer of from about 93 to 40 parts of acrylonitrile with from about seven to about 60 parts by weight of vinylidene chloride.

32. The particle in accordance with claim 15 wherein the thermoplastic resinous material is a polymer of vinylbenzyl chloride.

33. The particle of claim 15 wherein the thermoplastic resinous material is a copolymer of from about 98 to 91 parts of chlorostyrene and one to eight parts of acrylic acid.

34. The particle in accordance with claim 15 wherein the thermoplastic resinous material is polystyrene.

35. A plurality of particles in accordance with claim 15 in closely spaced adjacent relationship, a thermoplastic synthetic resinous binder surrounding at least a major portion of the particles and adhering the particles together, and the binder becoming heat plastified at a temperature below the thermoplastic temperature of the particles.

36. The particles of claim 35 wherein the thermoplastic resinous binder is adhered to at least one surface of a substrate.

37. The material of claim 36 wherein the particles and binder form a substantially continuous layer.

38. The assembly of claim 37 wherein the substrate is a fibrous cellulosic material.

39. The assembly of claim 37 wherein the substrate is a container.

40. The assembly of claim 37 wherein the substrate is thermoplastic resinous material.

41. The assembly of claim 40 wherein the thermoplastic resinous substrate is in the form of a drinking cup.

42. A plurality of particles in accordance with claim 15, and a fluid, hardenable synthetic material, resinous material. the particles being dispersed within the hardenable resinous material.

43. The particles of claim 42 wherein the fluid resinous hardenable material is an exothermic material which, on curing, provides sufficient heat to cause the particles to expand.

44. The particles of claim 43 wherein the hardenable resinous material is an epoxy resin.

45. A coating comprising a plurality of thermoplastic resinous expandable generally spherical particles having encapsulated therein a single occlusion consisting essentially of a volatile organic liquid raising agent as a distinct and separate liquid phase which becomes gaseous at a temperature below the softening point of the thermoplastic resinous particles, the occlusion being generally centrally disposed, the particles being adhered together by means of a flexible thermoplastic synthetic resinous binder, the binder being present in a proportion just sufficient to adhere the particles together and adhere them to a substrate, and the binder becoming thermoplastic at a temperature below the thermoplastic temperature of the particles.

46. A thermoplastic resinous expandable particle comprising a generally spherical shell of polymethyl methacrylate having encapsulated therein an occlusion essentially of a volatile organic liquid raising agent as a distinct and separate liquid phase which becomes gaseous at a temperature below the softening point of the polymethyl methacrylate polymer, wherein the raising agent comprises at least 20 volume percent based on the monomers and the raising agent, the particle being generally impermeable to the liquid raising agent.

47. The particle of claim 15 having a diameter of from about 1 to 50 microns.

48. The particle of claim 15 having a diameter of from about 2 to 10 microns.

* * * * *

PO-1050
(5/69)

UNITED STATES PATENT OFFICE
CERTIFICATE OF CORRECTION

Patent No. 3,615,972            Dated 26 October 1971

Inventor(s) Donald S. Morehouse, Jr. and Roland J. Tetreault

It is certified that error appears in the above-identified patent and that said Letters Patent are hereby corrected as shown below:

In column 3, line 62, delete "incroporated" and insert -- incorporated --.

In column 4, line 22, change "$CCl_2F_3$" to -- $CCl_2F_2$ --.

In column 6, line 29, delete "expanded" and insert -- means --.

In column 9, line 42, change "($10^{15}$ cm.)" to -- ($10^{-5}$ cm.) --; in line 61 change "colloidal" to -- colloid --.

In column 17, line 6, delete "1013" and insert -- $10^{13}$ --; in line 56 delete "50-90" and insert -- 50-95 --.

In column 18, line 14, insert -- unit -- between "per" and "volume".

In column 22, line 42, delete "produce" and insert -- product --.

In column 25, line 40, delete "tended" and insert -- obtained --.

Column 26, line 26, delete "form" and insert -- from --.

Column 31, line 1, change "shown" to -- showed --; in line 58 delete "orthochlorostyrene" and insert -- heating --.

Column 32, line 28, delete "33" and insert -- having --.

Column 39, line 57, delete "agent" and insert -- and --.

Column 41, line 33, delete "material" after "synthetic".

Column 42, line 22, insert -- consisting -- between "occlusion" and "essentially".

Signed and sealed this 16th day of May 1972.

SEAL)
Attest:

DWARD M.FLETCHER,JR.
Attesting Officer

ROBERT GOTTSCHALK
Commissioner of Patents